(12) United States Patent
Li

(10) Patent No.: US 11,897,596 B2
(45) Date of Patent: Feb. 13, 2024

(54) METHODS AND APPARATUS FOR AUTOMATICALLY EXTENDING AIRCRAFT WING FLAPS IN RESPONSE TO DETECTING AN EXCESS ENERGY STEEP DESCENT CONDITION

(71) Applicant: The Boeing Company, Chicago, IL (US)

(72) Inventor: Sherwin C. Li, Edmonds, WA (US)

(73) Assignee: THE BOEING COMPANY, Arlington, VA (US)

( * ) Notice: Subject to any disclaimer, the term of this patent is extended or adjusted under 35 U.S.C. 154(b) by 203 days.

(21) Appl. No.: 17/357,377

(22) Filed: Jun. 24, 2021

(65) Prior Publication Data
US 2022/0024562 A1    Jan. 27, 2022

Related U.S. Application Data

(60) Provisional application No. 63/054,528, filed on Jul. 21, 2020.

(51) Int. Cl.
*B64C 13/16*    (2006.01)
*G05D 1/00*    (2006.01)
*B64C 9/32*    (2006.01)

(52) U.S. Cl.
CPC .............. *B64C 13/16* (2013.01); *B64C 9/323* (2013.01); *G05D 1/0066* (2013.01)

(58) Field of Classification Search
CPC ...... B64C 13/16; B64C 9/323; G05D 1/0066; G05D 1/0607

USPC ............................................................. 701/3
See application file for complete search history.

(56) References Cited

U.S. PATENT DOCUMENTS

| | | | | |
|---|---|---|---|---|
| 3,698,669 A * | 10/1972 | Miller | .................. | G05D 1/0607 244/196 |
| 3,740,004 A * | 6/1973 | Doniger | ............... | G05D 1/0607 701/4 |
| 4,750,127 A * | 6/1988 | Leslie | .................. | G05D 1/0005 701/16 |
| 5,113,346 A * | 5/1992 | Orgun | .................. | G05D 1/0676 701/16 |
| 2006/0175468 A1* | 8/2006 | Huynh | .................... | B64C 9/323 244/212 |
| 2010/0200704 A1* | 8/2010 | Berens | ..................... | B64C 13/16 244/76 A |
| 2014/0148979 A1* | 5/2014 | De Prins | .............. | G05D 1/0676 701/3 |
| 2015/0057915 A1* | 2/2015 | La Civita | ............. | G08G 5/0026 701/120 |

(Continued)

*Primary Examiner* — Hunter B Lonsberry
*Assistant Examiner* — Robert Louis Pinkerton
(74) *Attorney, Agent, or Firm* — HANLEY, FLIGHT & ZIMMERMAN, LLC

(57) ABSTRACT

Methods and apparatus for automatically extending aircraft wing flaps in response to detecting an excess energy steep descent condition are described. An example control system of an aircraft includes one or more processors. The one or more processors determine whether the aircraft is experiencing an excess energy steep descent (EESD) condition. In response to determining that the aircraft is experiencing the EESD condition, the one or more processors command an actuator of the aircraft coupled to a flap of the aircraft to extend the flap from a current flap position to a subsequent flap position defined by a flap extension sequence.

20 Claims, 11 Drawing Sheets

600 ↘

| Extension Stage | Start Position (Start Detent) | End Position (End Detent) |
|---|---|---|
| 1st | 0° (UP) | 10° (1) |
| 2nd | 10° (1) | 13° (5) |
| 3rd | 13° (5) | 17° (15) |
| 4th | 17° (15) | 22° (20) |
| 5th | 22° (20) | 28° (25) |
| 6th | 28° (25) | 35° (30) |

602

(56) References Cited

U.S. PATENT DOCUMENTS

| | | | |
|---|---|---|---|
| 2015/0088340 A1* | 3/2015 | Moser | B64C 13/16 |
| | | | 701/3 |
| 2015/0364045 A1* | 12/2015 | Lissajoux | G05D 1/0607 |
| | | | 701/3 |
| 2016/0009375 A1* | 1/2016 | Young | B64C 9/28 |
| | | | 701/4 |
| 2016/0229554 A1* | 8/2016 | Kawalkar | G08G 5/0056 |
| 2016/0231137 A1* | 8/2016 | Krogh | G05D 1/0808 |
| 2016/0318601 A1* | 11/2016 | Arnold | B64C 13/0425 |
| 2019/0196508 A1* | 6/2019 | Barba | G05D 1/0638 |
| 2020/0216166 A1* | 7/2020 | Sargent | B64D 7/00 |
| 2021/0141394 A1* | 5/2021 | Melendez | B64D 31/08 |

\* cited by examiner

500

| Flap Detent | Flap Position | Flap State |
|---|---|---|
| UP | 0° | Stowed |
| 1 | 10° | Partially Extended |
| 5 | 13° | Partially Extended |
| 15 | 17° | Partially Extended |
| 20 | 22° | Partially Extended |
| 25 | 28° | Partially Extended |
| 30 | 35° | Fully Extended |

| Extension Stage | Start Position (Start Detent) | End Position (End Detent) |
|---|---|---|
| 1st | 0° (UP) | 10° (1) |
| 2nd | 10° (1) | 13° (5) |
| 3rd | 13° (5) | 17° (15) |
| 4th | 17° (15) | 22° (20) |
| 5th | 22° (20) | 28° (25) |
| 6th | 28° (25) | 35° (30) |

| Flap Detent | Flap Position | Gamma Value Threshold |
|---|---|---|
| UP | 0° | -6° |
| 1 | 10° | -5.5° |
| 5 | 13° | -4.5° |
| 15 | 17° | -4° |
| 20 | 22° | -4° |
| 25 | 28° | -4° |
| 30 | 35° | -3.5° |

| Flap Detent | Flap Position | Velocity Threshold |
|---|---|---|
| UP | 0° | 260 knots |
| 1 | 10° | 240 knots |
| 5 | 13° | 220 knots |
| 15 | 17° | 210 knots |
| 20 | 22° | 200 knots |
| 25 | 28° | 190 knots |
| 30 | 35° | 180 knots |

FIG. 10

METHODS AND APPARATUS FOR AUTOMATICALLY EXTENDING AIRCRAFT WING FLAPS IN RESPONSE TO DETECTING AN EXCESS ENERGY STEEP DESCENT CONDITION

RELATED APPLICATIONS

This application claims priority to U.S. Provisional Patent Application No. 63/054,528, filed Jul. 21, 2020, entitled "Methods And Apparatus For Automatically Extending Aircraft Wing Flaps In Response To Detecting An Excess Energy Steep Descent Condition." The entirety of U.S. Provisional Patent Application No. 63/054,528 is hereby incorporated by reference herein.

FIELD OF THE DISCLOSURE

This disclosure relates generally to aircraft wing flaps and, more specifically, to methods and apparatus for automatically extending aircraft wing flaps in response to detecting an excess energy steep descent (EESD) condition.

BACKGROUND

Aircraft wings commonly include flaps that are movable from a stowed position through a range of extended positions defined by a flap extension sequence. Movement of the flaps in a direction away from the stowed position and toward a fully-extended position (e.g., according to the flap extension sequence) increases the effective curvature of the aircraft wings, thereby raising the maximum lift coefficient of the aircraft and reducing the stalling speed thereof. The flaps are typically maintained in a stowed position during high-speed flight operations (e.g., cruise) of the aircraft, and deployed into an extended position during low-speed flight operations (e.g., takeoff, descent, approach, landing, etc.) of the aircraft.

Conventionally, deployment (e.g., extension) of the flaps is a manually-initiated process that requires input from an end user (e.g., the pilot) of the aircraft. Deployment of the flaps typically occurs in response to the end user of the aircraft moving a flap lever located in the cockpit of the aircraft from a first detent corresponding to a first position of the flaps to a second detent corresponding to a second position of the flaps. While certain automated flap deployment solutions have been developed for commercial aircraft, there are currently no known automated flap deployment solutions for extending the flaps when the aircraft is in steep descent with the engines of the aircraft running at idle thrust (e.g., an EESD condition).

SUMMARY

Example methods and apparatus for automatically extending aircraft wing flaps in response to detecting an EESD condition are disclosed. In some examples, a control system of an aircraft is disclosed. In some disclosed examples, the control system comprises one or more processors to determine whether the aircraft is experiencing an EESD condition. In some disclosed examples, the one or more processors, in response to determining that the aircraft is experiencing the EESD condition, are to command an actuator of the aircraft coupled to a flap of the aircraft to extend the flap from a current flap position to a subsequent flap position defined by a flap extension sequence.

In some examples, a method is disclosed. In some disclosed examples, the method comprises determining, by executing one or more machine-readable instructions with one or more processors of a control system of an aircraft, whether the aircraft is experiencing an EESD condition. In some disclosed examples, the method further comprises, in response to determining that the aircraft is experiencing the EESD condition, commanding, by executing one or more machine-readable instructions with the one or more processors, an actuator of the aircraft coupled to a flap of the aircraft to extend the flap from a current flap position to a subsequent flap position defined by a flap extension sequence.

In some examples, a computer program product is disclosed. In some disclosed examples, the computer program product comprises a computer usable medium having a computer readable program code embodied therein. In some disclosed examples, the computer readable program code is adapted to be executed to implement a method of automatically extending aircraft wing flaps. In some disclosed examples, the method comprises determining whether an aircraft is experiencing an EESD condition. In some disclosed examples, the method further comprises, in response to determining that the aircraft is experiencing the EESD condition, commanding an actuator of the aircraft coupled to a flap of the aircraft to extend the flap from a current flap position to a subsequent flap position defined by a flap extension sequence.

BRIEF DESCRIPTION OF THE DRAWINGS

FIG. 5 illustrates an example flap position table defining example positions of the flaps of the aircraft of FIGS. 1-3 corresponding to the detents of the flap lever of the cockpit control panel of FIG. 4.

FIG. 6 is an example flap extension sequence table defining an example flap extension sequence for the flaps of the aircraft of FIGS. 1-3.

FIG. 9 illustrates an example gamma value threshold correlation table that can be accessed and/or otherwise consulted to determine a gamma value threshold.

FIG. 10 illustrates an example velocity threshold correlation table that can be accessed and/or otherwise consulted to determine a velocity threshold.

Figure 1:
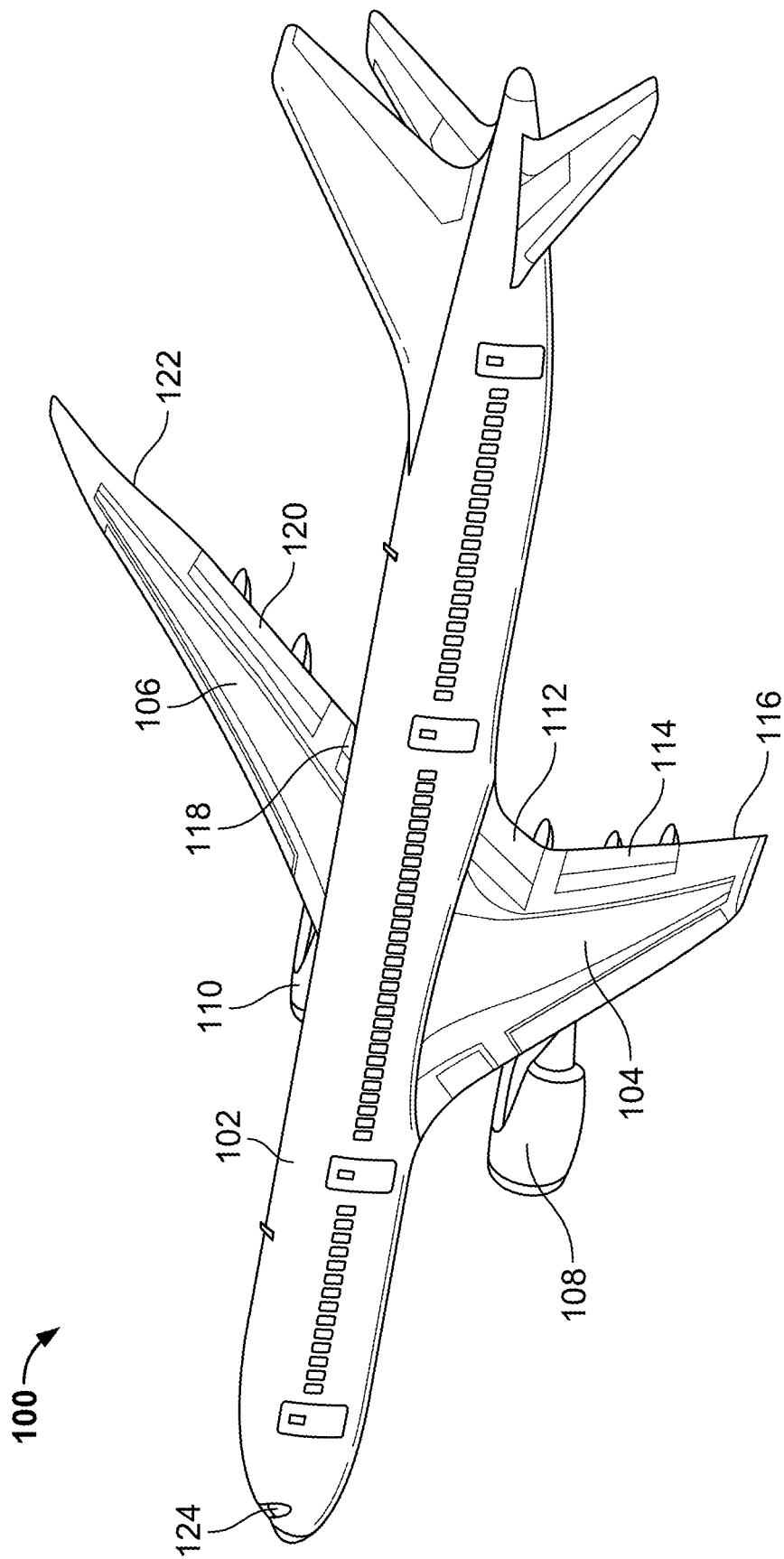
FIG. 1 is a perspective view of an example aircraft.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Conventionally, deployment (e.g., extension) of aircraft wing flaps is a manually-initiated process that requires input from an end user (e.g., the pilot) of the aircraft. Deployment of the flaps typically occurs in response to the end user of the aircraft moving a flap lever located in the cockpit of the aircraft from a first detent corresponding to a first position of the flaps to a second detent corresponding to a second position of the flaps. While certain automated flap deployment solutions have been developed for commercial aircraft, there are currently no known automated flap deployment solutions for extending the flaps when the aircraft is in steep descent with the engines of the aircraft running at idle thrust (e.g., an EESD condition).

In this regard, conventional flap extension logic for commercial aircraft utilizes only the speed of the aircraft to invoke automated flap transitions (e.g., automated extensions from a current flap position to subsequent flap position), with such automated flap transitions occurring in response to the speed of the aircraft progressively dropping below a decreasing series of corresponding flap transition speed thresholds. The existence of an EESD condition challenges such conventional flap extension logic since the aircraft is unable to slow down toward the next lower flap transition speed threshold while descending, and therefore unable to trigger the conventional flap extension logic to increase the amount of drag on the aircraft. Fundamentally, this "go-down slow-down" problem cannot be adequately resolved by flap extension logic that utilizes only the speed of the aircraft to invoke flap transitions. Thus, if an aircraft implementing conventional flap extension logic experiences an EESD condition, the end user (e.g., the pilot) must identify and intervene to mitigate the EESD condition, either by determining the appropriate time to deploy the flaps, or by leveraging other more aggressive lift and drag manipulating devices (e.g., speed brakes, air brakes, spoilers, etc.) to increase drag count and "burn off" the total energy (e.g., the potential energy plus the kinetic energy) associated with the steep descent. These aggressive means of intervention do not enable optimized use of fuel, and accordingly increase the operating cost of the aircraft.

Unlike the conventional flap extension logic described above which invokes automated flap transitions under circumstances that depend entirely on the speed of the aircraft, the methods and apparatus disclosed herein invoke automated flap transitions in response to detecting that an aircraft is experiencing an EESD condition. The disclosed methods and apparatus automatically detect that the aircraft is experiencing an EESD condition based on evaluation of the position(s) of the throttle lever(s) of the aircraft, and further based on evaluation of a gamma value (e.g., a flight path angle) of the aircraft relative to a flap-position-specific gamma value threshold. In response to detecting that the aircraft is experiencing the EESD condition, the disclosed methods and apparatus automatically command actuators of the aircraft coupled to the flaps of the aircraft to extend the flaps from a current flap position to a subsequent flap position defined by a flap extension sequence.

The disclosed methods and apparatus advantageously invoke automated flap transitions that, unlike the automated flap transitions invoked by the conventional flap extension logic described above, are not dependent upon the speed of the aircraft dropping below the subsequent flap transition speed threshold. By instead invoking automated flap transitions based on detected occurrences of EESD conditions, the disclosed methods and apparatus advantageously accelerate (e.g., relative to conventional flap extension logic) the timing by which such automated flap transitions occur, and also advantageously provide a flap transition solution for instances where the aircraft may otherwise be unable to decelerate to the subsequent flap transition threshold due to the excess energy associated with the steep descent.

The disclosed methods and apparatus perform the aforementioned detection and command operations in an automated manner without manual assistance and/or manual input from the end user (e.g., the pilot) of the aircraft. By enabling automated flap transitions in a manner that depends on detection of EESD conditions instead of depending on the speed of the aircraft dropping below a flap transition speed threshold, the disclosed methods and apparatus provide automated flap extension solutions having expanded, increased, and/or optimized operating availability relative to the conventional automated flap extension solutions described above.

The automated flap extension solutions provided by the disclosed methods and apparatus advantageously increase the amount of drag on the aircraft while the aircraft is experiencing an EESD condition, thereby resolving the aforementioned "go-down slow-down" problem. Increasing the amount of drag on the aircraft advantageously reduces the speed (e.g., the ground speed, the true airspeed, the equivalent airspeed, the calibrated airspeed, the indicated airspeed, etc.) of the aircraft. Reducing the speed of the aircraft while the aircraft is descending facilitates improved control and/or maneuverability of the aircraft during approach and/or the landing.

FIG. 1 is a perspective view of an example aircraft 100 including an example fuselage 102, a first example wing 104 coupled to the fuselage 102, and a second example wing 106 coupled to the fuselage 102. In other examples, the aircraft 100 can have a wing configuration which differs from that shown in FIG. 1. In this regard, the aircraft 100 of FIG. 1 can be implemented by and/or as any type and/or form of aircraft including at least one wing having at least one flap. In the illustrated example of FIG. 1, the aircraft 100 also includes a first example engine 108 coupled to the first wing 104, and a second example engine 110 coupled to the second wing 106. In other examples, the aircraft 100 can have an engine configuration which differs from that shown in FIG. 1. For example, the aircraft 100 can include multiple engines coupled to each of the first and second wings 104, 106, and/or disposed in other locations on the aircraft 100 (e.g., coupled to the fuselage 102, coupled to a tail section of the aircraft 100, etc.).

The first wing 104 of FIG. 1 includes a first example flap 112 (e.g., an inboard flap) and a second example flap 114 (e.g., an outboard flap), with each of the first and second flaps 112, 114 being disposed along an example fixed trailing edge 116 of the first wing 104. The first and second flaps 112, 114 of the first wing 104 can be moved (e.g., extended via an actuator located within the first wing 104) rearward and/or downward relative to the fixed trailing edge 116 of the first wing 104 from a stowed position through a range of extended positions defined by a flap extension sequence (e.g., the flap extension sequence 602 defined by the flap extension sequence table 600 of FIG. 6, described below). Movement of the first and second flaps 112, 114 of the first wing 104 in a direction away from the stowed position and toward a fully-extended position (e.g., according to the flap extension sequence) increases the effective curvature of the first wing 104, which may be advantageous during takeoff, descent, approach, and/or landing of the aircraft 100.

Figure 2:
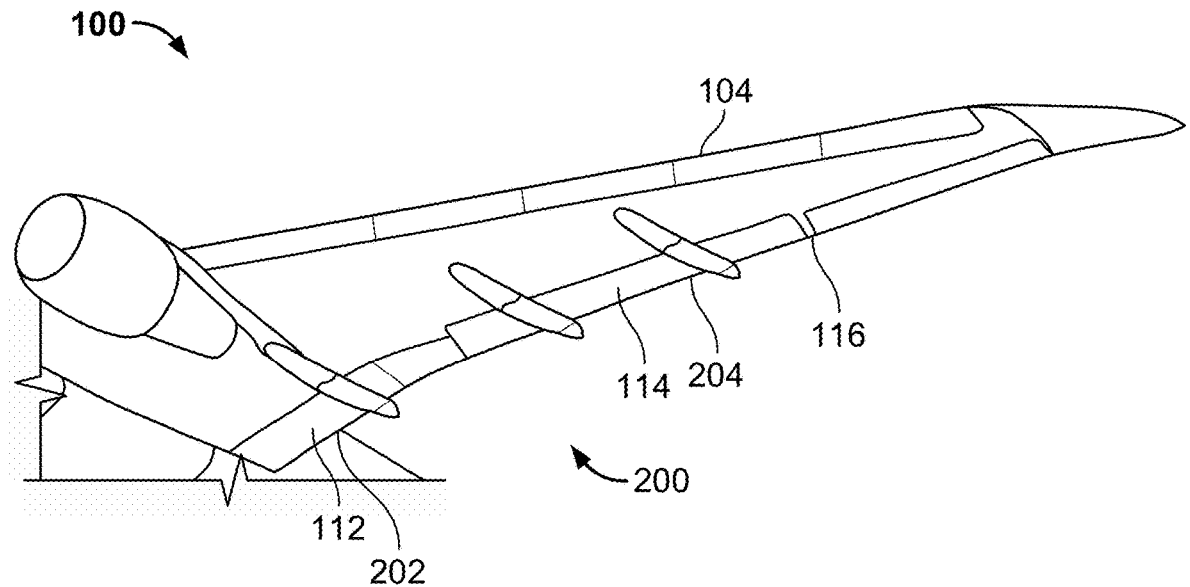
FIG. 2 is a perspective view of the first wing of the aircraft of FIG. 1 with the first flap and the second flap of the first wing shown in an example stowed position.
Figure 3:
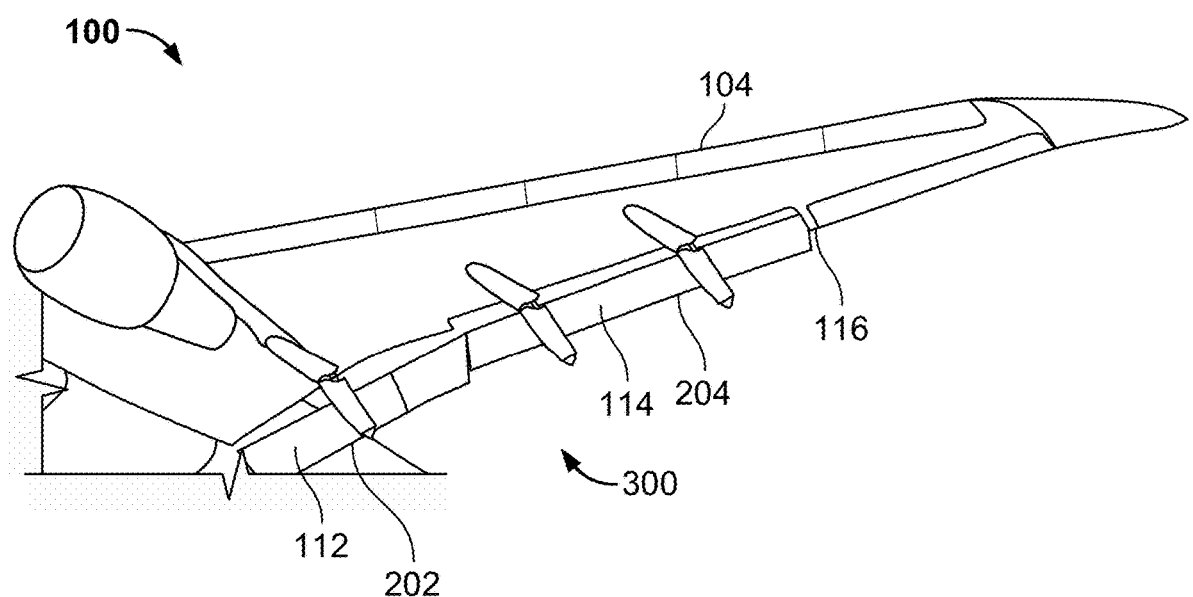
FIG. 3 is a perspective view of the first wing of the aircraft of FIGS. 1 and 2 with the first flap and the second flap of the first wing shown in an example extended position.

FIG. 2 is a perspective view of the first wing 104 of the aircraft 100 of FIG. 1 with the first and second flaps 112, 114 of the first wing 104 shown in an example stowed position 200. When the first and second flaps 112, 114 of the first wing 104 are positioned in the stowed position 200 shown in FIG. 2, respective example trailing edges 202, 204 of the first and second flaps 112, 114 of the first wing 104 are generally aligned with the fixed trailing edge 116 of the first wing 104. FIG. 3 is a perspective view of the first wing 104 of the aircraft 100 of FIGS. 1 and 2 with the first and second flaps 112, 114 of the first wing 104 shown in an example extended position 300, which may correspond to either a partially-extended flap position or a fully-extended flap position defined by a flap extension sequence. When the first and second flaps 112, 114 of the first wing 104 are positioned in the extended position 300 shown in FIG. 3, the respective trailing edges 202, 204 of the first and second flaps 112, 114 of the first wing 104 are positioned rearward and/or downward relative to the fixed trailing edge 116 of the first wing 104. Movement of the first and second flaps 112, 114 of the first wing 104 from the stowed position 200 shown in FIG. 2 to the extended position 300 shown in FIG. 3 increases the effective curvature of the first wing 104.

Returning to the illustrated example of FIG. 1, the second wing 106 of the aircraft 100 is structured and/or configured in a manner that generally mirrors the above-described structure and/or configuration of the first wing 104 of the aircraft 100. In this regard, the second wing 106 of FIG. 1 includes a first example flap 118 (e.g., an inboard flap) and a second example flap 120 (e.g., an outboard flap), with each of the first and second flaps 118, 120 being disposed along an example fixed trailing edge 122 of the second wing 106. The first and second flaps 118, 120 of the second wing 106 can be moved (e.g., extended via an actuator located within the second wing 106) rearward and/or downward relative to the fixed trailing edge 122 of the second wing 106 from a stowed position through a range of extended positions defined by a flap extension sequence (e.g., the flap extension sequence 602 defined by the flap extension sequence table 600 of FIG. 6, described below). Movement of the first and second flaps 118, 120 of the second wing 106 in a direction away from the stowed position and toward a fully-extended position (e.g., according to the flap extension sequence) increases the effective curvature of the second wing 106, which may be advantageous during takeoff, descent, approach, and/or landing of the aircraft 100.

Figure 4:
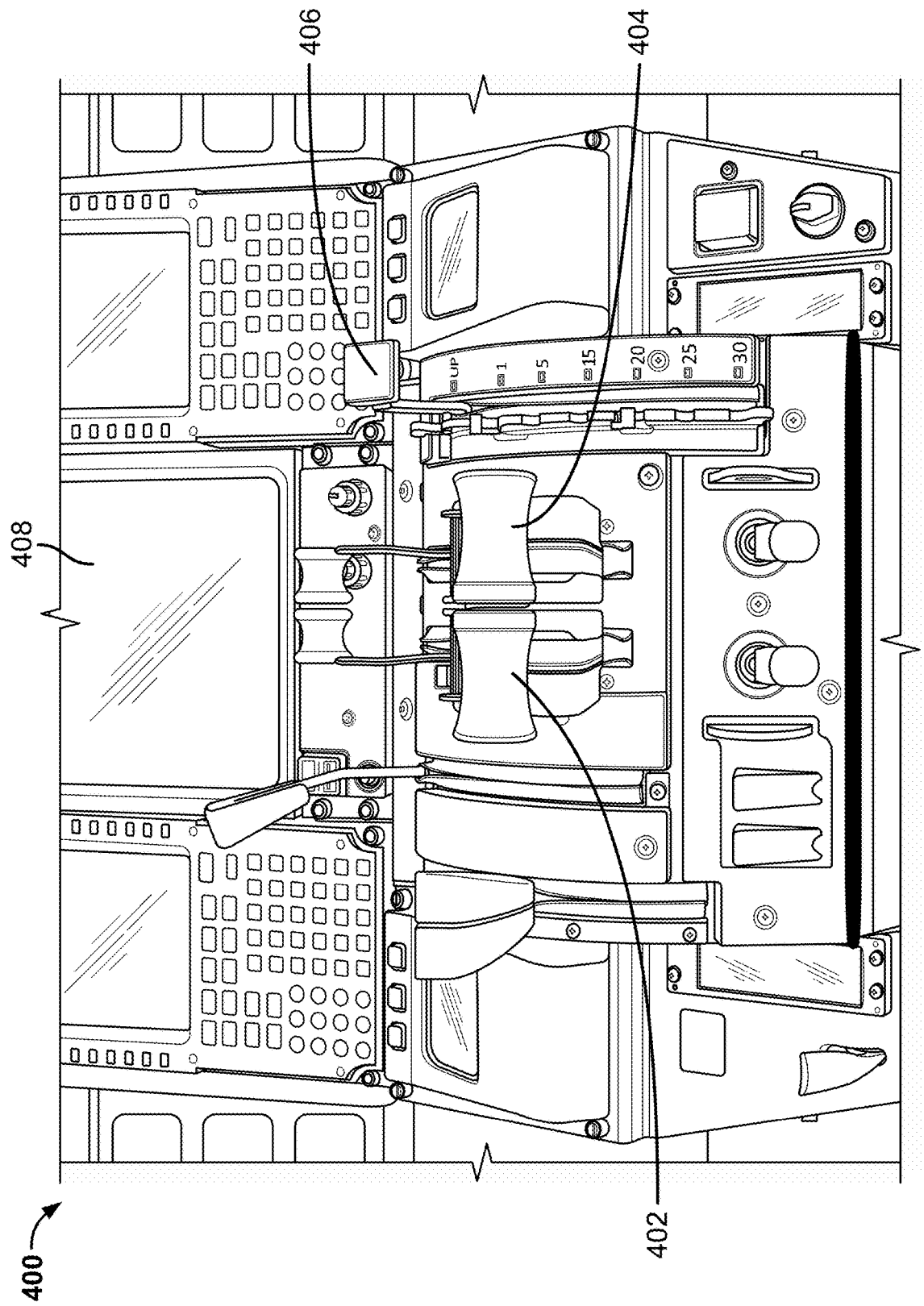
FIG. 4 illustrates an example cockpit control panel of the cockpit of the aircraft of FIGS. 1-3.

In the illustrated example of FIG. 1, the aircraft 100 also includes an example cockpit 124 having cockpit controls (e.g., a cockpit control panel having control levers, buttons, switches, knobs, etc.) that enable an end user (e.g., a pilot) of the aircraft 100 to command and/or control various operational aspects of the aircraft 100. FIG. 4 illustrates an example cockpit control panel 400 of the cockpit 124 of the aircraft 100 of FIGS. 1-3. The cockpit control panel 400 of FIG. 4 includes a first example throttle lever 402, a second example throttle lever 404, an example flap lever 406, and an example display 408.

The first throttle lever 402 of the cockpit control panel 400 of FIG. 4 is configured to control the thrust output of the first engine 108 of the aircraft 100. In the illustrated example of FIG. 4, the first throttle lever 402 is movable (e.g., slidable and/or rotatable) from a zero (0) throttle position corresponding to idle thrust of the first engine 108 to a one-hundred (100) throttle position corresponding to full and/or maximum thrust of the first engine 108. In other examples, the throttle position range over which the first throttle lever 402 is movable can be broader or narrower relative to the above-described throttle position range. The throttle position (e.g., between 0 and 100) of the first throttle lever 402 can be sensed, measured, and/or detected via a throttle position sensor located on and/or operatively coupled to the first throttle lever 402. Throttle position data indicating the sensed, measured, and/or detected throttle position of the first throttle lever 402 can be presented via the display 408 of the cockpit control panel 400 of FIG. 4.

The second throttle lever 404 of the cockpit control panel 400 of FIG. 4 is configured to control the thrust output of the second engine 110 of the aircraft 100. In the illustrated example of FIG. 4, the second throttle lever 404 is movable (e.g., slidable and/or rotatable) from a zero (0) throttle position corresponding to idle thrust of the second engine 110 to a one-hundred (100) throttle position corresponding to full and/or maximum thrust of the second engine 110. In other examples, the throttle position range over which the second throttle lever 404 is movable can be broader or narrower relative to the above-described throttle position range. The throttle position (e.g., between 0 and 100) of the second throttle lever 404 can be sensed, measured, and/or detected via a throttle position sensor located on and/or operatively coupled to the second throttle lever 404. Throttle position data indicating the sensed, measured, and/or detected throttle position of the second throttle lever 404 can be presented via the display 408 of the cockpit control panel 400 of FIG. 4.

The flap lever 406 of the cockpit control panel 400 of FIG. 4 is configured to control the flap position of the flaps 112, 114, 118, 120 of the wings 104, 106 of the aircraft 100. In the illustrated example of FIG. 4, the flap lever 406 is movable (e.g., slidable and/or rotatable) from an "UP" detent corresponding to a stowed position of the flaps 112, 114, 118, 120 through a range of flap deployment detents (e.g., shown successively in FIG. 4 as a "1" detent, a "5" detent, a "15" detent, a "20" detent, a "25" detent, and a "30" detent) corresponding to progressively extended positions of the flaps 112, 114, 118, 120. In other examples, the detents over which the flap lever 406 is movable may differ in number and/or identification relative to the detents shown in FIG. 4. The flap positions of the flaps 112, 114, 118, 120 can be sensed, measured, and/or detected via flap position sensors located on and/or operatively coupled to the flaps 112, 114, 118, 120 and/or the wings 104, 106 of the aircraft 100. Flap position data indicating the sensed, measured, and/or detected flap positions of the flaps 112, 114, 118, 120 can be presented via the display 408 of the cockpit control panel 400 of FIG. 4.

FIG. 5 illustrates an example flap position table 500 defining example positions 502 of the flaps 112, 114, 118, 120 of the aircraft 100 of FIGS. 1-3 corresponding to the detents of the flap lever 406 of the cockpit control panel 400 of FIG. 4. As shown in the flap position table 500 of FIG. 5, the flaps 112, 114, 118, 120 are extended and/or positioned at an angle of zero degrees (0°) (e.g., relative to the wings 104, 106) when the flap lever 406 is positioned in the "UP" detent, at an angle of ten degrees (10°) when the flap lever 406 is positioned in the "1" detent, at an angle of thirteen degrees (13°) when the flap lever 406 is positioned in the "5" detent, at an angle of seventeen degrees (17°) when the flap lever 406 is positioned in the "15" detent, at an angle of twenty-two degrees (22°) when the flap lever 406 is positioned in the "20" detent, at an angle of twenty-eight degrees (28°) when the flap lever 406 is positioned in the "25" detent, and at an angle of thirty-five degrees (35°) when the flap lever 406 is positioned in the "30" detent. In other examples, the correlation between the positions of the flaps 112, 114, 118, 120 and the detents of the flap lever 406 can differ relative to those defined by the flap position table 500 of FIG. 5.

FIG. 6 is an example flap extension sequence table 600 defining an example flap extension sequence 602 for the flaps 112, 114, 118, 120 of the aircraft 100 of FIGS. 1-3. The flap extension sequence 602 defined by the flap extension sequence table 600 of FIG. 6 includes predetermined successive flap extension positions between a stowed position of the flaps 112, 114, 118, 120 (e.g., the stowed position 200 of FIG. 2) and a fully-extended position of the flaps 112, 114, 118, 120 (the extended position 300 of FIG. 3) to which the flaps 112, 114, 118, 120 can be successively (e.g., sequentially) extended.

For example, as shown in the flap extension sequence table 600 of FIG. 6, a first stage of the flap extension sequence 602 extends the flaps 112, 114, 118, 120 rearward and/or downward until the flaps 112, 114, 118, 120 are positioned at an angle of ten degrees (10°) relative to the wings 104, 106. A second stage of the flap extension sequence 602 following the first stage further extends the flaps 112, 114, 118, 120 rearward and/or downward until the flaps 112, 114, 118, 120 are positioned at an angle of thirteen degrees (13°) relative to the wings 104, 106. A third stage of the flap extension sequence 602 following the second stage further extends the flaps 112, 114, 118, 120 rearward and/or downward until the flaps 112, 114, 118, 120 are positioned at an angle of seventeen degrees (17°) relative to the wings 104, 106. A fourth stage of the flap extension sequence 602 following the third stage further extends the flaps 112, 114, 118, 120 rearward and/or downward until the flaps 112, 114, 118, 120 are positioned at an angle of twenty-two degrees (22°) relative to the wings 104, 106. A fifth stage of the flap extension sequence 602 following the fourth stage further extends the flaps 112, 114, 118, 120 rearward and/or downward until the flaps 112, 114, 118, 120 are positioned at an angle of twenty-eight degrees (28°) relative to the wings 104, 106. A sixth stage of the flap extension sequence 602 following the fifth stage further extends the flaps 112, 114, 118, 120 rearward and/or downward until the flaps 112, 114, 118, 120 are positioned at an angle of thirty-five degrees (35°) relative to the wings 104, 106. Completion of the sixth stage of the flap extension sequence 602 results in the flaps 112, 114, 118, 120 being fully extended relative to the wings 104, 106. In other examples, the flap extension sequence 602 may differ in terms of the number of stages and/or the correlation between the stages and the positions of the flaps 112, 114, 118, 120 relative to those of the flap extension sequence 602 defined by the flap extension sequence table 600 of FIG. 6.

The flap extension sequence 602 defined by the flap extension sequence table 600 of FIG. 6 can be accessed and/or otherwise consulted by a control system of the aircraft 100 during a flight of the aircraft 100. For example, the control system of the aircraft 100 may access and/or otherwise consult the flap extension sequence 602 defined by the flap extension sequence table 600 of FIG. 6 in connection with an automated flap extension protocol implemented via the control system. In such an example, the control system of the aircraft 100 may implement the operations of the automated flap extension protocol without manual assistance and/or manual input from the end user (e.g., the pilot) of the aircraft 100, as further described below.

Figure 7:
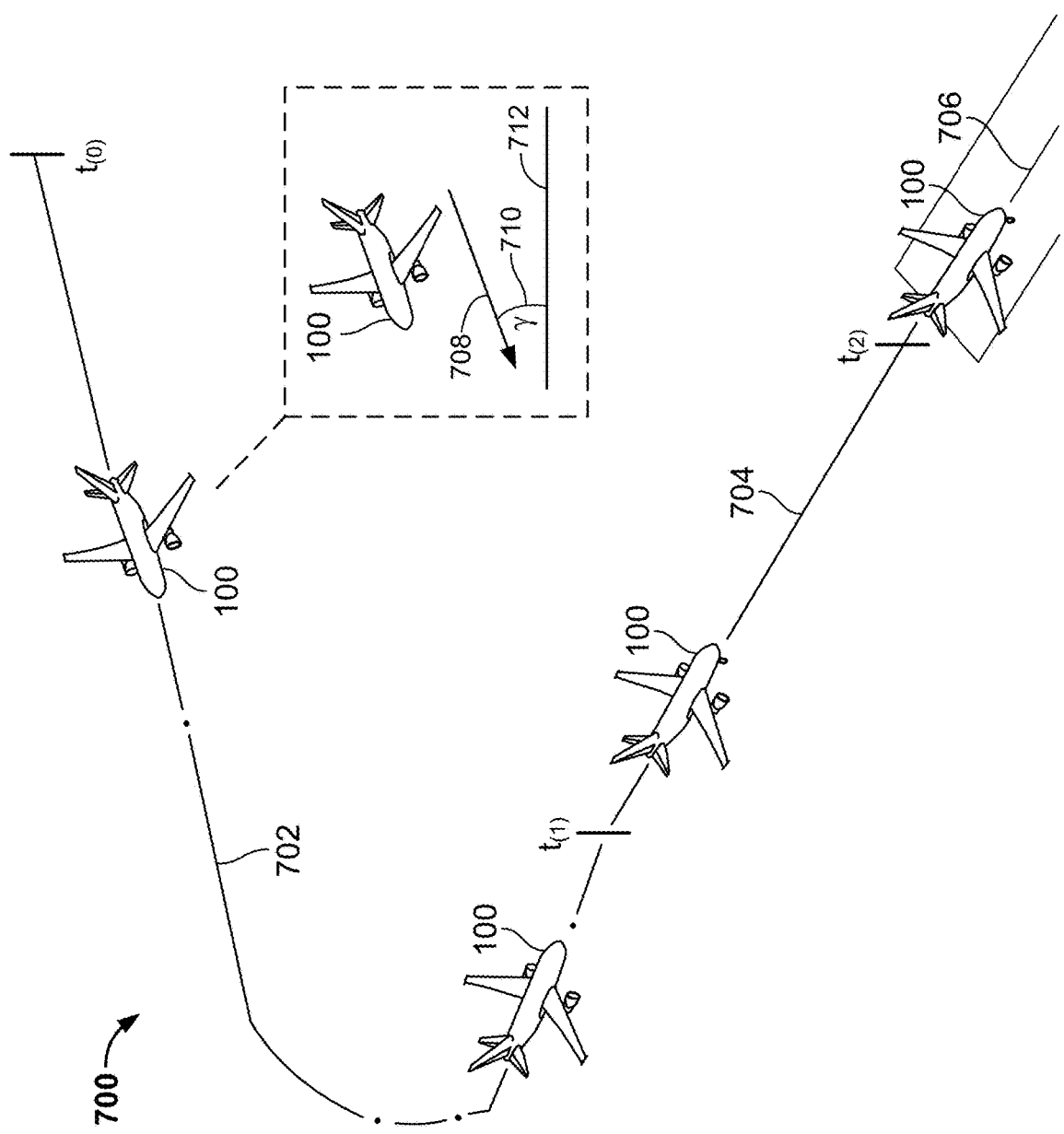
FIG. 7 illustrates an example flight path of the aircraft of FIGS. 1-3.

FIG. 7 illustrates an example flight path 700 of the aircraft 100 of FIGS. 1-3. The flight path 700 of FIG. 7 includes an example descent segment 702 (e.g., spanning from time $t_0$ to time $t_1$), an example approach segment 704 (e.g., spanning from time $t_1$ to time $t_2$) that follows the descent segment 702, and an example landing segment 706 (e.g., beginning at time $t_2$) that follows the approach segment 704. As the aircraft 100 is traveling along the descent segment 702 and/or the approach segment 704 of the flight path 700, the flight path 700 is defined in part by an example velocity vector 708 that is oriented at an example flight path angle 710 (e.g., gamma, or γ) relative to an example horizon 712. The flight path angle 710 indicates the extent to which the aircraft 100 is descending. The aircraft 100 can experience an EESD condition in instances where the flight path angle 710 exceeds a defined flight path angle threshold (e.g., indicating a steep descent of the aircraft 100) while the engines 108, 110 of the aircraft 100 are running at idle thrust.

The disclosed methods and apparatus automatically detect that the aircraft 100 is experiencing the EESD condition. In response to detecting that the aircraft 100 is experiencing the EESD condition, the disclosed methods and apparatus automatically command actuators of the aircraft 100 coupled to the flaps 112, 114, 118, 120 of the aircraft 100 to extend the flaps 112, 114, 118, 120 from a current flap position to a subsequent flap position defined by a flap extension sequence (e.g., the flap extension sequence 602 defined by the flap extension sequence table 600 of FIG. 6). The disclosed methods and apparatus perform the aforementioned detection and command operations in an automated manner without manual assistance and/or manual input from the end user (e.g., the pilot) of the aircraft 100. The automated extension of the flaps 112, 114, 118, 120 via the disclosed methods and apparatus advantageously increases the amount of drag on the aircraft 100. Increasing the amount of drag on the aircraft 100 advantageously reduces the speed (e.g., the ground speed, the true airspeed, the equivalent airspeed, the calibrated airspeed, the indicated airspeed, etc.) of the aircraft 100. Reducing the speed of the aircraft 100 during the descent segment 702 of the flight path 700 facilitates improved control and/or maneuverability of the aircraft 100 during the approach segment 704 and/or the landing segment 706 of the flight path 700.

Figure 8:
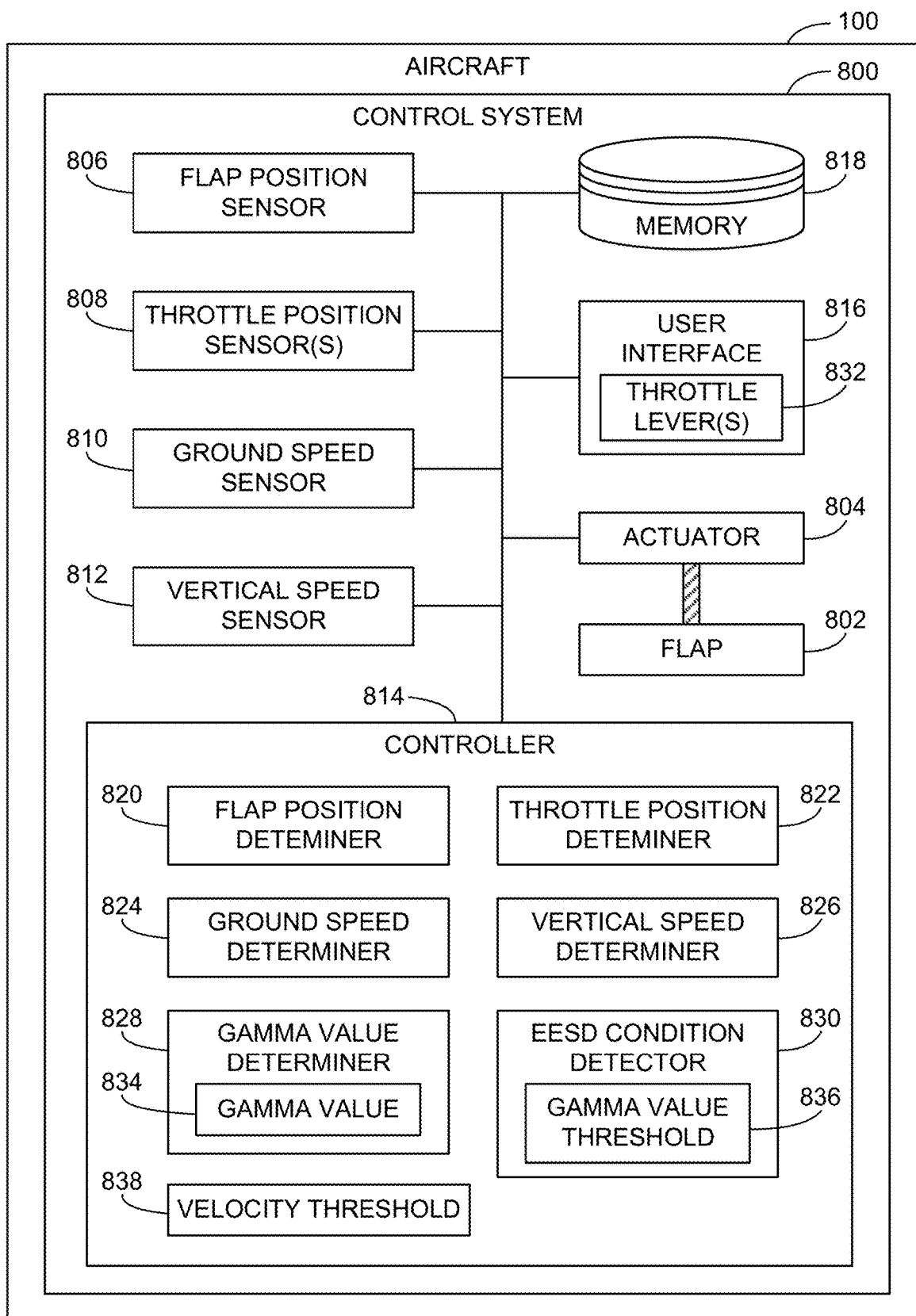
FIG. 8 is a block diagram of an example control system constructed in accordance with teachings of this disclosure and implemented onboard the aircraft of FIGS. 1-3 and 7.

FIG. 8 is a block diagram of an example control system 800 constructed in accordance with teachings of this disclosure and implemented onboard the aircraft 100 of FIGS. 1-3 and 7. The control system 800 of FIG. 8 is configured to automatically extend an aircraft wing flap in response to detecting that the aircraft is experiencing an EESD condition. In the illustrated example of FIG. 8, the control system 800 includes an example flap 802, an example actuator 804, an example flap position sensor 806, one or more example throttle position sensor(s) 808, an example ground speed sensor 810, an example vertical speed sensor 812, an example controller 814, an example user interface 816, and an example memory 818. The controller 814 of FIG. 8 includes an example flap position determiner 820, an example throttle position determiner 822, an example ground speed determiner 824, an example vertical speed determiner 826, an example gamma value determiner 828, and an example EESD condition detector 830. The user interface 816 of FIG. 8 includes one or more example throttle lever(s) 832. However, other example implementations of the control system 800 of FIG. 8 may include fewer or additional structures.

In the illustrated example of FIG. 8, the actuator 804 is mechanically coupled to the flap 802 and operatively coupled to the controller 814. The flap position sensor 806 is operatively coupled to the controller 814 and the memory 818. The throttle position sensor(s) 808 is/are operatively coupled to the controller 814 and the memory 818. The ground speed sensor 810 is operatively coupled to the controller 814 and the memory 818. The vertical speed sensor 812 is operatively coupled to the controller 814 and the memory 818. The controller 814 is operatively coupled to the actuator 804, the flap position sensor 806, the throttle position sensor(s) 808, the ground speed sensor 810, the vertical speed sensor 812, the user interface 816, and the memory 818. The user interface 816 is operatively coupled to the controller 814 and the memory 818. The memory 818 is operatively coupled to the flap position sensor 806, the throttle position sensor(s) 808, the ground speed sensor 810, the vertical speed sensor 812, the controller 814, and the user interface 816. However, other example implementations of the control system 800 of FIG. 8 may include fewer or additional mechanical and/or operative couplings between and/or among the structures of the control system 800.

The flap 802 of FIG. 8 can be implemented by and/or as any flap that is movably coupled to a wing of an aircraft, including without limitation any of the flaps 112, 114, 118, 120 of the aircraft 100. The actuator 804 of FIG. 8 can be implemented by and/or as any type(s) and/or any number(s) of actuator(s) configured to fit partially and/or fully within and/or on a wing of an aircraft (e.g., the wings 104, 106 of the aircraft 100) to which the flap 802 of FIG. 2 is movably coupled, and further configured to extend the flap 802 of FIG. 8 over a desired and/or specified range of positions. In some examples, the actuator 804 of FIG. 8 can be implemented by and/or as an electro-mechanical actuation system that includes one or more electronic component(s). In other examples, the actuator 804 of FIG. 8 can be implemented by and/or as a hydro-mechanical actuation system that includes one or more hydraulic component(s). In still other examples, the actuator 804 of FIG. 8 can be implemented by and/or as a pneumatic-mechanical actuation system that includes one or more pneumatic component(s). The actuator 804 of FIG. 8 can include any type(s) and/or number(s) of mechanical components including, for example, any type(s) and/or any number(s) of motors, valves, gears, clutches, latches, pistons, rods, shafts, links, pulleys, chains, belts, hinges, pins, biasing elements, shape memory alloys, etc.

The flap position sensor 806 of FIG. 8 can be located on and/or operatively coupled to the flap 802 and/or the actuator 804 of FIG. 8. The flap position sensor 806 senses, measures, and/or detects the position (e.g., the angular position) of the flap 802 relative to a reference position (e.g., a reference angular position) of the flap 802. In some examples, the flap position sensor 806 continuously senses, measures, and/or detects the position of the flap 802. In other examples, the flap position sensor 806 periodically senses, measures, and/or detects the position of the flap 802 based on a timing interval and/or a sampling frequency implemented via the controller 814 of FIG. 8.

Flap position data sensed, measured, and/or detected by the flap position sensor 806 of FIG. 8 can be of any quantity, type, form and/or format, and can be stored in the memory 818 of FIG. 8. Flap position data sensed, measured, and/or detected by the flap position sensor 806 can be accessed by the flap position determiner 820 of FIG. 8 and/or, more generally, by the controller 814 of FIG. 8, either from the memory 818 or directly from the flap position sensor 806.

The throttle position sensor(s) 808 of FIG. 8 can be located on and/or operatively coupled to corresponding ones of the throttle lever(s) 832 of FIG. 8. In some examples, each throttle position sensor 808 can be implemented by and/or as a rotary variable differential transformer (RVDT) located on and/or operatively coupled to the corresponding throttle lever 832. Each throttle position sensor 808 of FIG. 8 senses, measures, and/or detects the position (e.g., the angular position) of the corresponding throttle lever 832 of FIG. 8 relative to a reference position (e.g., a reference angular position) of the corresponding throttle lever 832. In some examples, each throttle position sensor 808 continuously senses, measures, and/or detects the position of the corresponding throttle lever 832. In other examples, each throttle position sensor 808 periodically senses, measures, and/or detects the position of the corresponding throttle lever 832 based on a timing interval and/or a sampling frequency implemented via the controller 814 of FIG. 8.

Throttle position data sensed, measured, and/or detected by the throttle position sensor(s) 808 of FIG. 8 can be of any quantity, type, form and/or format, and can be stored in the memory 818 of FIG. 8. Throttle position data sensed, measured, and/or detected by the throttle position sensor(s) 808 can be accessed by the throttle position determiner 822 of FIG. 8 and/or, more generally, by the controller 814 of FIG. 8, either from the memory 818 or directly from the throttle position sensor(s) 808.

The ground speed sensor 810 of FIG. 8 can be located on and/or within any portion of the aircraft 100 (e.g., on and/or within the fuselage 102, the wings 104, 106, etc.). In some examples, the ground speed sensor 810 can be implemented by and/or as an inertial reference unit (IRU) of the aircraft 100. The ground speed sensor 810 of FIG. 8 senses, measures, and/or detects the ground speed of the aircraft 100 (e.g., the horizontal speed of the aircraft 100 relative to a reference ground surface over which the aircraft 100 is flying). In some examples, the ground speed sensor 810 of FIG. 8 continuously senses, measures, and/or detects the ground speed of the aircraft 100. In other examples, the ground speed sensor 810 of FIG. 8 periodically senses, measures, and/or detects the ground speed of the aircraft 100 based on a timing interval and/or a sampling frequency implemented via the controller 814 of FIG. 8.

Ground speed data sensed, measured, and/or detected by the ground speed sensor 810 of FIG. 8 can be of any quantity, type, form and/or format, and can be stored in the memory 818 of FIG. 8. Ground speed data sensed, measured, and/or detected by the ground speed sensor 810 can be accessed by the ground speed determiner 824 of FIG. 8 and/or, more generally, by the controller 814 of FIG. 8, either from the memory 818 or directly from the ground speed sensor 810.

The vertical speed sensor 812 of FIG. 8 can be located on and/or within any portion of the aircraft 100 (e.g., on and/or within the fuselage 102, the wings 104, 106, etc.). In some examples, the vertical speed sensor 812 can be implemented by and/or as an inertial reference unit (IRU) of the aircraft 100. The vertical speed sensor 812 of FIG. 8 senses, measures, and/or detects the vertical speed (e.g., the barometric vertical speed or sink rate) of the aircraft 100. In some examples, the vertical speed sensor 812 of FIG. 8 continuously senses, measures, and/or detects the vertical speed of the aircraft 100. In other examples, the vertical speed sensor 812 of FIG. 8 periodically senses, measures, and/or detects the vertical speed of the aircraft 100 based on a timing interval and/or a sampling frequency implemented via the controller 814 of FIG. 8.

Vertical speed data sensed, measured, and/or detected by the vertical speed sensor 812 of FIG. 8 can be of any quantity, type, form and/or format, and can be stored in the memory 818 of FIG. 8. Vertical speed data sensed, measured, and/or detected by the vertical speed sensor 812 can be accessed by the vertical speed determiner 826 of FIG. 8 and/or, more generally, by the controller 814 of FIG. 8, either from the memory 818 or directly from the vertical speed sensor 812.

In addition to the ground speed sensor 810 of FIG. 8 and the vertical speed sensor 812 of FIG. 8 described above, the control system 800 of FIG. 8 can also include one or more other speed sensor(s) (e.g., a true airspeed sensor, an equivalent airspeed sensor, a calibrated airspeed sensor, an indicated airspeed sensor, etc.) that respectively sense, measure, and/or detect a corresponding speed (e.g., a true airspeed, an equivalent airspeed, a calibrated airspeed, an indicated airspeed, etc.) of the aircraft 100. Corresponding speed data sensed, measured, and/or detected by such other speed sensor(s) can be of any quantity, type, form and/or format, and can be stored in the memory 818 of FIG. 8. Corresponding speed data sensed, measured, and/or detected by such other speed sensor(s) can be accessed by the controller 814 of FIG. 8, either from the memory 818 or directly from such other speed sensor(s).

The controller 814 of FIG. 8 manages and/or controls the operation of the actuator 804 of FIG. 8 and/or the movement (e.g., extension) of the flap 802 of FIG. 8, including without limitation managing and/or controlling the operation of the actuator 804 and/or the movement of the flap 802 to automatically extend the flap 802 in response to detecting that the aircraft 100 is experiencing an EESD condition. The controller 814 of FIG. 8 can be located on and/or within any portion of the aircraft 100 (e.g., on and/or within the fuselage 102, the wings 104, 106, etc.). In the illustrated example of FIG. 8, the controller 814 includes the flap position determiner 820, the throttle position determiner 822, the ground speed determiner 824, the vertical speed determiner 826, the gamma value determiner 828, and the EESD condition detector 830 of FIG. 8, each of which is discussed in further detail herein. In instances where the control system 800 of FIG. 8 additionally includes one or more other speed sensor(s) (e.g., a true airspeed sensor, an equivalent airspeed sensor, a calibrated airspeed sensor, an indicated airspeed sensor, etc.), the controller 814 of FIG. 8 may include a corresponding one or more other speed determiner(s) (e.g., a true airspeed determiner, an equivalent airspeed determiner, a calibrated airspeed determiner, an indicated airspeed determiner, etc.). The flap position determiner 820, the throttle position determiner 822, the ground speed determiner 824, the vertical speed determiner 826, the other speed determiner(s), the gamma value determiner 828, the EESD condition detector 830, and/or, more generally, the controller 814 of FIG. 8 can individually and/or collectively be implemented by any type(s) and/or any number(s) of semiconductor device(s) (e.g., microprocessor(s), microcontroller(s), etc.) and/or circuit(s).

The flap position determiner 820 of the controller 814 of FIG. 8 determines and/or identifies the position (e.g., the current position) of the flap 802 of FIG. 8 based on the most-recently available flap position data sensed, measured, and/or detected by the flap position sensor 806 of FIG. 8. In some examples, the flap position determiner 820 determines and/or identifies the position of the flap 802 by accessing, obtaining, and/or receiving current (e.g., the most-recently sensed, measured, and/or detected) flap position data directly from the flap position sensor 806. In other examples, the flap position determiner 820 determines and/or identifies the position of the flap 802 by accessing and/or obtaining current (e.g., the most-recently stored) flap position data from the memory 818 of FIG. 8.

Flap position data determined, identified, processed, and/or output by and/or at the flap position determiner 820 of FIG. 8 can be of any quantity, type, form and/or format, and can be stored in the memory 818 of FIG. 8. Flap position data determined, identified, processed, and/or output by the flap position determiner 820 can be accessed by the EESD condition detector 830 of FIG. 8 and/or, more generally, by the controller 814 of FIG. 8, either from the memory 818 or directly from the flap position determiner 820.

The throttle position determiner 822 of the controller 814 of FIG. 8 determines and/or identifies the position (e.g., the current position) of the throttle lever(s) 832 of FIG. 8 based on the most-recently available throttle position data sensed, measured, and/or detected by the throttle position sensor(s) 808 of FIG. 8. In some examples, the throttle position determiner 822 determines and/or identifies the position of the throttle lever(s) 832 by accessing, obtaining, and/or receiving current (e.g., the most-recently sensed, measured, and/or detected) throttle position data directly from the throttle position sensor(s) 808. In other examples, the throttle position determiner 822 determines and/or identifies the position of the throttle lever(s) 832 by accessing and/or obtaining current (e.g., the most-recently stored) throttle position data from the memory 818 of FIG. 8.

Throttle position data determined, identified, processed, and/or output by and/or at the throttle position determiner 822 of FIG. 8 can be of any quantity, type, form and/or format, and can be stored in the memory 818 of FIG. 8. Throttle position data determined, identified, processed, and/or output by the throttle position determiner 822 can be accessed by the EESD condition detector 830 of FIG. 8 and/or, more generally, by the controller 814 of FIG. 8, either from the memory 818 or directly from the throttle position determiner 822.

The ground speed determiner 824 of the controller 814 of FIG. 8 determines and/or identifies the ground speed (e.g., the current ground speed) of the aircraft 100 based on the most-recently available ground speed data sensed, measured, and/or detected by the ground speed sensor 810 of FIG. 8. In some examples, the ground speed determiner 824 determines and/or identifies the ground speed of the aircraft 100 by accessing, obtaining, and/or receiving current (e.g., the most-recently sensed, measured, and/or detected) ground speed data directly from the ground speed sensor 810. In other examples, the ground speed determiner 824 determines and/or identifies the ground speed of the aircraft 100 by accessing and/or obtaining current (e.g., the most-recently stored) ground speed data from the memory 818 of FIG. 8.

Ground speed data determined, identified, processed, and/or output by and/or at the ground speed determiner 824 of FIG. 8 can be of any quantity, type, form and/or format, and can be stored in the memory 818 of FIG. 8. Ground speed data determined, identified, processed, and/or output by the ground speed determiner 824 can be accessed by the gamma value determiner 828 of FIG. 8 and/or, more generally, by the controller 814 of FIG. 8, either from the memory 818 or directly from the ground speed determiner 824.

The vertical speed determiner 826 of the controller 814 of FIG. 8 determines and/or identifies the vertical speed (e.g., the current vertical speed) of the aircraft 100 based on the most-recently available vertical speed data sensed, measured, and/or detected by the vertical speed sensor 812 of FIG. 8. In some examples, the vertical speed determiner 826 determines and/or identifies the vertical speed of the aircraft 100 by accessing, obtaining, and/or receiving current (e.g., the most-recently sensed, measured, and/or detected) vertical speed data directly from the vertical speed sensor 812. In other examples, the vertical speed determiner 826 determines and/or identifies the vertical speed of the aircraft 100 by accessing and/or obtaining current (e.g., the most-recently stored) vertical speed data from the memory 818 of FIG. 8.

Vertical speed data determined, identified, processed, and/or output by and/or at the vertical speed determiner 826 of FIG. 8 can be of any quantity, type, form and/or format, and can be stored in the memory 818 of FIG. 8. Vertical speed data determined, identified, processed, and/or output by the vertical speed determiner 826 can be accessed by the gamma value determiner 828 of FIG. 8 and/or, more generally, by the controller 814 of FIG. 8, either from the memory 818 or directly from the vertical speed determiner 826.

In instances where the controller 814 of the control system 800 of FIG. 8 includes one or more other speed determiner(s) (e.g., a true airspeed determiner, an equivalent airspeed determiner, a calibrated airspeed determiner, an indicated airspeed determiner, etc.) beyond the ground speed determiner 824 of FIG. 8 and the vertical speed determiner 826 of FIG. 8 described above, such other speed determiner(s) respectively determine and/or identify a corresponding other speed (e.g., a current true airspeed, a current equivalent airspeed, a current calibrated airspeed, a current indicted airspeed, etc.) of the aircraft 100 based on the most-recently available other speed data sensed, measured, and/or detected by the corresponding other speed sensor (e.g., the true airspeed sensor, the equivalent airspeed sensor, the calibrated airspeed sensor, the indicated airspeed sensor, etc.).

The gamma value determiner 828 of the controller 814 of FIG. 8 determines and/or calculates the gamma value (e.g., the current gamma value) of the aircraft 100 based on the most-recently available ground speed data (e.g., as determined and/or identified by the ground speed determiner 824 of FIG. 8) and the most-recently available vertical speed data (e.g., as determined and/or identified by the vertical speed determiner 826 of FIG. 8). For example, the gamma value determiner 828 can determine and/or calculate an example gamma value 834 of the aircraft 100 based on a function that may be expressed as:

$$\gamma = a\tan\left(\frac{\dot{h}_{baro}}{V_g}\right) \quad \text{Equation 1}$$

where "$\gamma$" is the gamma value, "$\dot{h}_{baro}$" is the vertical speed of the aircraft 100, and "$V_g$" is the ground speed of the aircraft 100.

In instances where the controller 814 of the control system 800 of FIG. 8 includes one or more other speed determiner(s) (e.g., a true airspeed determiner, an equivalent airspeed determiner, a calibrated airspeed determiner, an indicated airspeed determiner, etc.) beyond the ground speed determiner 824 of FIG. 8 and the vertical speed determiner 826 of FIG. 8 described above, the gamma value determiner 828 of FIG. 8 can alternatively determine the gamma value 834 based on the most-recently available other speed data (e.g., true airspeed data determined by the true airspeed determiner, equivalent airspeed data determined by the equivalent airspeed determiner, calibrated airspeed data determined by the calibrated airspeed determiner, indicated airspeed data determined by the indicated airspeed determiner, etc.) and the most-recently available vertical speed data (e.g., as determined and/or identified by the vertical speed determiner 826 of FIG. 8).

The gamma value 834 determined and/or calculated by the gamma value determiner 828 of FIG. 8 represents a flight path angle of the aircraft 100 (e.g., the flight path angle 710 of FIG. 7). Gamma value data determined, calculated, processed, and/or output by and/or at the gamma value determiner 828 of FIG. 8 can be of any quantity, type, form and/or format, and can be stored in the memory 818 of FIG. 8. Gamma value data determined, calculated, processed, and/or output by the gamma value determiner 828 can be accessed by the EESD condition detector 830 of FIG. 8 and/or, more generally, by the controller 814 of FIG. 8, either from the memory 818 or directly from the gamma value determiner 828.

The EESD condition detector 830 of the controller 814 of FIG. 8 determines and/or detects whether the aircraft 100 is experiencing an EESD condition. In some examples, the EESD condition detector 830 determines and/or detects whether the aircraft 100 is experiencing an EESD condition based on the most-recently available throttle position data (e.g., as determined and/or identified by the throttle position determiner 822 of FIG. 8); (2) the most-recently available gamma value data (e.g., as determined and/or calculated by the gamma value determiner 828 of FIG. 8); and (3) a gamma value threshold established based on the most-recently available flap position data (e.g., as determined and/or identified by the flap position determiner 820 of FIG. 8).

For example, the EESD condition detector 830 determines whether the throttle position data indicates that the position of each throttle lever 832 of FIG. 8 corresponds to an idle thrust position (e.g., a zero (0) throttle position). The EESD condition detector 830 additionally (e.g., concurrently) determines whether the gamma value data indicates that the gamma value 834 of the aircraft 100 exceeds an example gamma value threshold 836. In some examples, the gamma value threshold 836 to which the gamma value 834 is to be compared varies depending on (e.g., as a function of) the position of the flap 802 of FIG. 8. In this regard, the EESD condition detector 830 determines and/or identifies the gamma value threshold 836 by accessing and/or otherwise consulting a gamma value threshold correlation table that defines the applicable gamma value threshold based on a correlated position of the flap 802 corresponding to the current flap position indicated by the flap position data. FIG. 9 illustrates an example gamma value threshold correlation table 900 that can be accessed and/or otherwise consulted by the EESD condition detector 830 to determine an applicable gamma value threshold. In some examples, the gamma value threshold correlation table 900 of FIG. 9 can be combined (e.g., logically and/or relationally combined) with the flap position table 500 of FIG. 5 and/or the flap extension sequence table 600 of FIG. 6.

In some examples, the gamma value threshold 836 to which the gamma value 834 is to be compared can additionally vary depending on (e.g., as a function of) the speed (e.g., the ground speed, the true airspeed, the equivalent airspeed, the calibrated airspeed, the indicated airspeed, etc.) of the aircraft 100. In this regard, the applicable gamma value threshold defined by the gamma value threshold correlation table can be based not only on a correlated position of the flap 802 corresponding to the current flap position indicated by the flap position data, but also on a correlated speed of the aircraft 100 corresponding to the current speed of the aircraft (e.g., as indicated by ground speed data, true airspeed data, equivalent airspeed data, calibrated airspeed data, indicated airspeed data, etc.). In such examples, the gamma value threshold correlation table 900 of FIG. 9 can be expanded (e.g., logically and/or relationally expanded) to include speed correlation data in addition to the flap position correlation data shown in FIG. 9.

The EESD condition detector 830 of FIG. 8 evaluates the aforementioned data inputs in a manner that resembles an AND logical gate. In this regard, the EESD condition detector 830 indicates (e.g., via a first output signal) that an EESD condition has been detected only when: (1) the throttle position data indicates that the position of each throttle lever 832 of FIG. 8 corresponds to an idle thrust position; and (2) the gamma value data indicates that the gamma value 834 of the aircraft 100 exceeds the applicable gamma value threshold 836. In this same regard, the EESD condition detector 830 conversely indicates (e.g., via a second output signal differing from the first output signal of the EESD condition detector 830) that an EESD condition has not been detected when either: (1) the throttle position data indicates that the position of any throttle lever 832 of FIG. 8 does not correspond to an idle thrust position; or (2) the gamma value data indicates that the gamma value 834 of the aircraft 100 does not exceed the applicable gamma value threshold 836.

EESD condition detection data determined, processed, generated, and/or output by and/or at the EESD condition detector 830 of FIG. 8 can be of any quantity, type, form and/or format, and can be stored in the memory 818 of FIG. 8. EESD condition detection data determined, processed, generated, and/or output by and/or at the EESD condition detector 830 can be accessed by the controller 814 of FIG. 8, either from the memory 818 or directly from the EESD condition detector 830.

The controller 814 of FIG. 8 evaluates the EESD condition detection data determined, processed, generated, and/or output by and/or at the EESD condition detector 830 of FIG. 8. The controller 814 additionally (e.g., concurrently) determines whether the speed data (e.g., ground speed data, true airspeed data, equivalent airspeed data, calibrated airspeed data, indicated airspeed data, etc.) associated with the aircraft 100 indicates that the airspeed of the aircraft 100 exceeds an example velocity threshold 838 (e.g., $V_{FE}$) of a subsequent flap position of the flap 802 of FIG. 8. In some examples, the velocity threshold 838 of the subsequent flap position to which the speed of the aircraft 100 is to be compared varies depending on (e.g., as a function of) the position of the flap 802. In this regard, the controller 814 determines and/or identifies the velocity threshold 838 of the subsequent flap position of the flap 802 by accessing and/or otherwise consulting a velocity threshold correlation table that defines the applicable velocity threshold based on a correlated position of the flap 802 corresponding to the subsequent flap position (e.g., the flap position that sequentially follows the current flap position, as defined by the flap extension sequence). FIG. 10 illustrates an example velocity threshold correlation table 1000 that can be accessed and/or otherwise consulted by the controller 814 to determine an applicable velocity threshold of the subsequent flap position. In some examples, the velocity threshold correlation table 1000 of FIG. 10 can be combined (e.g., logically and/or relationally combined) with the flap position table 500 of FIG. 5, the flap extension sequence table 600 of FIG. 6, and/or the gamma value threshold correlation table 900 of FIG. 9.

The controller 814 of FIG. 8 evaluates the aforementioned data inputs in a manner that resembles an AND logical gate. In this regard, the controller 814 commands (e.g., via an output and/or control signal) the actuator 804 of FIG. 8 to extend the flap 802 of FIG. 8 from the current flap position to the subsequent flap position (e.g., as defined by the flap extension sequence 602 of the flap extension sequence table 600 of FIG. 6) only when: (1) the EESD condition detector 830 of FIG. 8 indicates that an EESD condition has been detected; and (2) the speed data (e.g., ground speed data, true airspeed data, equivalent airspeed data, calibrated airspeed data, indicated airspeed data, etc.) associated with the aircraft 100 indicates that the speed of the aircraft 100 does not exceed the applicable velocity threshold 838 of the subsequent flap position of the flap 802. In this same regard, the controller 814 conversely does not command the actuator 804 to extend the flap 802 from the current flap position to the subsequent flap position when either: (1) the EESD condition detector 830 of FIG. 8 indicates that an EESD condition has not been detected; or (2) the speed data indicates that the speed of the aircraft 100 exceeds the applicable velocity threshold 838 of the subsequent flap position of the flap 802.

In some examples, the controller 814 of FIG. 8 additionally determines and/or identifies whether the flap 802 of FIG. 8 has been fully extended. For example, the controller 814 can determine that the flap 802 has been extended to a fully-extended position identified via the applicable flap extension sequence (e.g., the flap extension sequence 602 of the flap extension sequence table 600 of FIG. 6). In this regard, the flap extension sequence includes predetermined successive flap extension positions between a stowed position of the flap 802 and a fully-extended position of the flap 802 to which the flap 802 can be successively (e.g., sequentially) extended via the actuator 804. If the controller 814 determines that the flap 802 is not fully extended, the above-described automated flap extension protocol of the control system 800 of FIG. 8 continues in an iterative manner (e.g., until the flap 802 is fully extended). If the controller 814 instead determines that the flap 802 is fully extended, the above-described automated flap extension protocol of the control system 800 of FIG. 8 is halted.

The above-described automated extension of the flap 802 of FIG. 8 (e.g., via the actuator 804 of FIG. 8 as commanded by the controller 814 of FIG. 8) from the current flap position to the subsequent flap position defined by the flap extension sequence advantageously increases the amount of drag on the aircraft 100. Increasing the amount of drag on the aircraft 100 advantageously reduces the speed (e.g., the ground speed, the true airspeed, the equivalent airspeed, the calibrated airspeed, the indicated airspeed, etc.) of the aircraft 100. Reducing the speed of the aircraft 100 during descent facilitates improved control and/or maneuverability of the aircraft 100 during approach and landing.

In some examples, the controller 814 of FIG. 8 additionally generates notifications to be presented, via the user interface 816 of FIG. 8, to an end user (e.g., a pilot) of the aircraft 100. For example, in response to determining that the airspeed (e.g., the ground speed, the true airspeed, the equivalent airspeed, the calibrated airspeed, the indicated airspeed, etc.) of the aircraft 100 exceeds the velocity threshold of the subsequent flap position of the flap 802 of FIG. 8, the controller 814 can generate a notification indicating a need for additional drag on the aircraft 100. Such a notification may alert the end user of the aircraft 100 that manual (e.g., pilot-initiated) deployment of an alternate control surface (e.g., a spoiler) of the aircraft 100 is needed to increase the amount of drag on the aircraft 100 and/or to decrease the speed (e.g., the ground speed, the true airspeed, the equivalent airspeed, the calibrated airspeed, the indicated airspeed, etc.) of the aircraft 100. As another example, in response to determining that the flap 802 of FIG. 8 is fully extended, the controller 814 can generate a notification indicating that the flap 802 is fully extended. Such a notification may alert the end user of the aircraft 100 that further extension of the flap 802 is not available, and/or that manual (e.g., pilot-initiated) deployment of an alternate control surface (e.g., a spoiler) of the aircraft 100 is needed to increase the amount of drag on the aircraft 100 and/or to decrease the speed (e.g., the ground speed, the true airspeed, the equivalent airspeed, the calibrated airspeed, the indicated airspeed, etc.) of the aircraft 100.

Actuator control signal data and/or notification data determined, processed, generated, and/or output by and/or at the controller 814 of FIG. 8 can be of any quantity, type, form and/or format, and can be stored in the memory 818 of FIG. 8. Actuator control signal data and/or notification data determined, processed, generated, and/or output by and/or at the controller 814 can be accessed by the actuator 804 of FIG. 8 and/or the user interface 816 of FIG. 8, either from the memory 818 or directly from the controller 814.

The user interface 816 of FIG. 8 facilitates interactions and/or communications between an end user (e.g., a pilot) of the aircraft 100 and the control system 800. In some examples, the user interface 816 can by implemented via the cockpit control panel 400 of FIG. 4 described above. The user interface 816 includes one or more input device(s) via which the user may input information and/or data to the controller 814 of the control system 800. For example, the input device(s) may include one or more control lever(s) (e.g., the throttle lever(s) 832 of FIG. 8, implemented as the first and second throttle levers 402, 404 of FIG. 4), button(s), knob(s), switch(es), touchscreen(s), audio sensor(s), microphone(s), and/or camera(s) that enable(s) the user to convey data and/or commands to the controller 814 and/or the memory 818 of FIG. 8, and/or, more generally, to the control system 800 of FIG. 8. The user interface 816 of FIG. 8 also includes one or more output device(s) via which the user interface 816 presents information and/or data in visual and/or audible form to the user. For example, the output device(s) may include one or more light emitting diode(s), touchscreen(s), and/or a liquid crystal display(s) for presenting visual information, and/or one or more speaker(s) for presenting audible information. Data and/or information that is received from and/or presented by the user interface 816 of FIG. 8 may be of any quantity, type, form and/or format, and may be stored in a computer-readable storage medium such as the memory 818 of FIG. 8 described below.

The memory 818 of FIG. 8 can be implemented by any type(s) and/or any number(s) of storage device(s) such as a storage drive, a flash memory, a read-only memory (ROM), a random-access memory (RAM), a cache and/or any other physical storage medium in which information is stored for any duration (e.g., for extended time periods, permanently, brief instances, for temporarily buffering, and/or for caching of the information). The information stored in the memory 818 of FIG. 8 may be stored in any file and/or data structure format, organization scheme, and/or arrangement. The memory 818 of FIG. 8 is accessible to the flap position sensor 806, the throttle position sensor(s) 808, the ground speed sensor 810, the vertical speed sensor 812, the controller 814 (including the flap position determiner 820, the throttle position determiner 822, the ground speed determiner 824, the vertical speed determiner 826, the gamma value determiner 828, and the EESD condition detector 830 of FIG. 8), and/or the user interface 816 of FIG. 8, and/or, more generally, to the control system 800 of FIG. 8.

In some examples, the memory 818 of FIG. 8 stores flap position data sensed, measured, and/or detected by the flap position sensor 806 of FIG. 8, and/or flap position data accessed, obtained, determined, processed, generated, and/or output by and/or at the flap position determiner 820 of the controller 814 of FIG. 8. In some examples, the memory 818 of FIG. 8 stores throttle position data sensed, measured, and/or detected by the throttle position sensor(s) 808 of FIG. 8, and/or throttle position data accessed, obtained, determined, processed, generated, and/or output by and/or at the throttle position determiner 822 of the controller 814 of FIG. 8. In some examples, the memory 818 of FIG. 8 stores ground speed data sensed, measured, and/or detected by the ground speed sensor 810 of FIG. 8, and/or ground speed data accessed, obtained, determined, processed, generated, and/or output by and/or at the ground speed determiner 824 of the controller 814 of FIG. 8. In some examples, the memory 818 of FIG. 8 stores vertical speed data sensed, measured, and/or detected by the vertical speed sensor 812 of FIG. 8, and/or vertical speed data accessed, obtained, determined, processed, generated, and/or output by and/or at the vertical speed determiner 826 of the controller 814 of FIG. 8. In some examples, the memory 818 of FIG. 8 stores gamma value data determined, processed, generated, and/or output by and/or at the gamma value determiner 828 of the controller 814 of FIG. 8.

In some examples, the memory 818 of FIG. 8 stores EESD condition detection data determined, processed, generated, and/or output by and/or at the EESD condition detector 830 of the controller 814 of FIG. 8. In some examples, the memory 818 of FIG. 8 stores idle thrust position data accessed and/or obtained by the EESD condition detector 830 of the controller 814 of FIG. 8. In some examples, the memory 818 of FIG. 8 stores flap extension sequence data accessed and/or obtained by the EESD condition detector 830 of the controller 814 of FIG. 8. In some examples, the memory 818 of FIG. 8 stores gamma value threshold data accessed and/or obtained by the EESD condition detector 830 of the controller 814 of FIG. 8. In some examples, the memory 818 of FIG. 8 stores velocity threshold data accessed and/or obtained by the controller 814 of FIG. 8. In some examples, the memory 818 of FIG. 8 stores control signal data output and/or transmitted from the controller 814 of FIG. 8 to the actuator 804 of FIG. 8. In some examples, the memory 818 of FIG. 8 stores data and/or information that is received from and/or presented by the user interface 816 of FIG. 8.

While an example manner of implementing the control system 800 is illustrated in FIG. 8, one or more of the elements, processes and/or devices illustrated in FIG. 8 may be combined, divided, re-arranged, omitted, eliminated and/or implemented in any other way. Further, the flap 802, the actuator 804, the flap position sensor 806, the throttle position sensor(s) 808, the ground speed sensor 810, the vertical speed sensor 812, the controller 814, the user interface 816, the memory 818, the flap position determiner 820, the throttle position determiner 822, the ground speed determiner 824, the vertical speed determiner 826, the gamma value determiner 828, the EESD condition detector 830, the throttle lever(s) 832, and/or, more generally, the control system 800 of FIG. 8 may be implemented by hardware, software, firmware and/or any combination of hardware, software and/or firmware. Thus, for example, any of the flap position sensor 806, the throttle position sensor(s) 808, the ground speed sensor 810, the vertical speed sensor 812, the controller 814, the user interface 816, the memory 818, the flap position determiner 820, the throttle position determiner 822, the ground speed determiner 824, the vertical speed determiner 826, the gamma value determiner 828, the EESD condition detector 830, and/or, more generally, the control system 800 of FIG. 8 could be implemented by one or more analog or digital circuit(s), logic circuit(s), programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the flap position sensor 806, the throttle position sensor(s) 808, the ground speed sensor 810, the vertical speed sensor 812, the controller 814, the user interface 816, the memory 818, the flap position determiner 820, the throttle position determiner 822, the ground speed determiner 824, the vertical speed determiner 826, the gamma value determiner 828, the EESD condition detector 830, and/or, more generally, the control system 800 of FIG. 8 is/are hereby expressly defined to include a non-transitory computer-readable storage device or storage disk such as a memory, a digital versatile disk (DVD), a compact disk (CD), a Blu-ray disk, etc. including the software and/or firmware. Further still, the flap 802, the actuator 804, the flap position sensor 806, the throttle position sensor(s) 808, the ground speed sensor 810, the vertical speed sensor 812, the controller 814, the user interface 816, the memory 818, the flap position determiner 820, the throttle position determiner 822, the ground speed determiner 824, the vertical speed determiner 826, the gamma value determiner 828, the EESD condition detector 830, the throttle lever(s) 832, and/or, more generally, the control system 800 of FIG. 8 may include one or more element(s), process(es) and/or device(s) in addition to, or instead of, those illustrated in FIG. 8, and/or may include more than one of any or all of the illustrated elements, processes and devices. As used herein, the phrase "in communication," including variations thereof, encompasses direct communication and/or indirect communication through one or more intermediary component(s), and does not require direct physical (e.g., wired) communication and/or constant communication, but rather additionally includes selective communication at periodic intervals, scheduled intervals, aperiodic intervals, and/or one-time events.

Figure 11A:
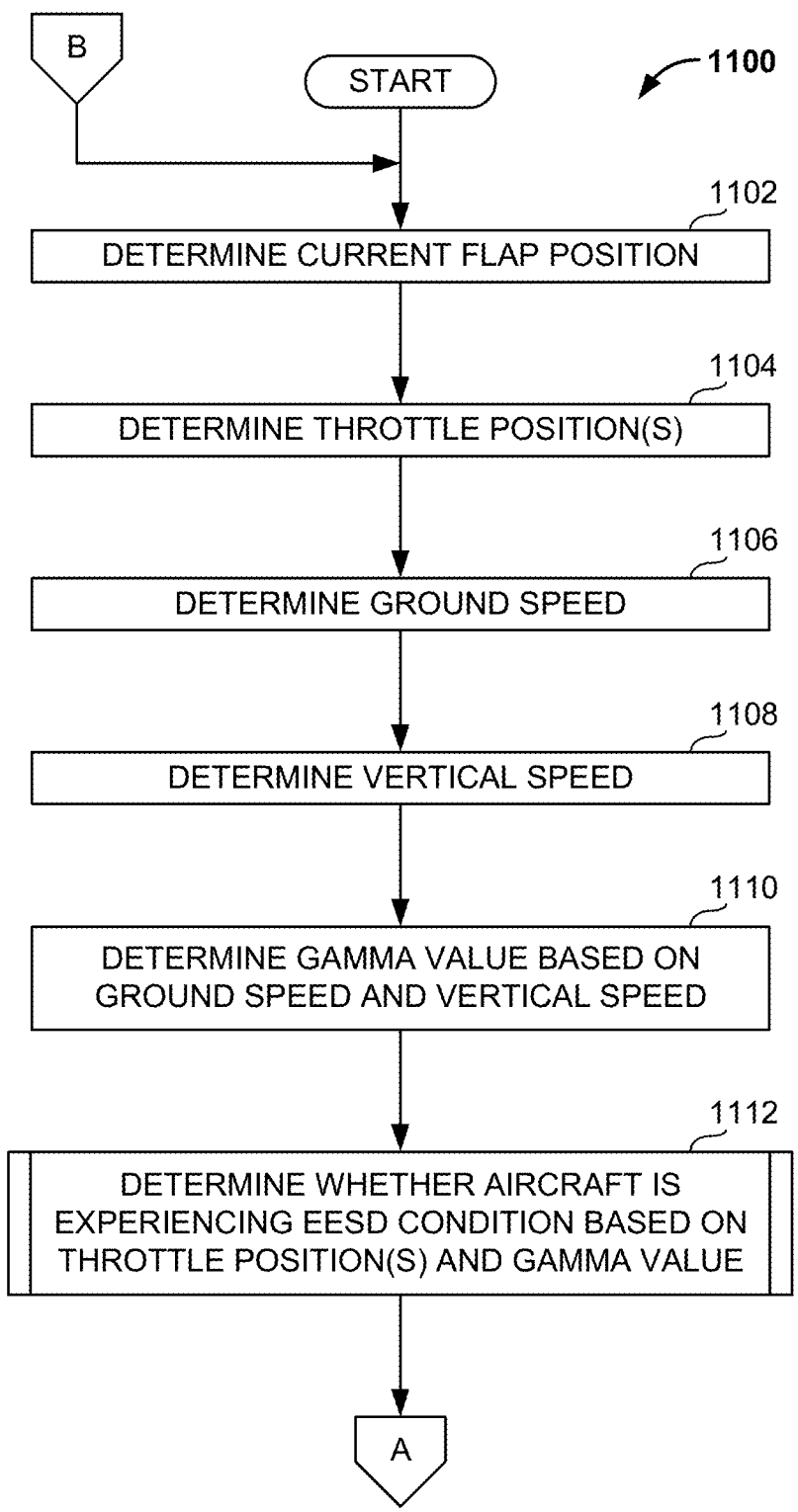
FIGS. 11A and 11B are a flowchart representative of example machine-readable instructions that may be executed to implement the control system of FIG. 8 to automatically extend an aircraft wing flap in response to detecting that the aircraft is experiencing an EESD condition.
Figure 11B:
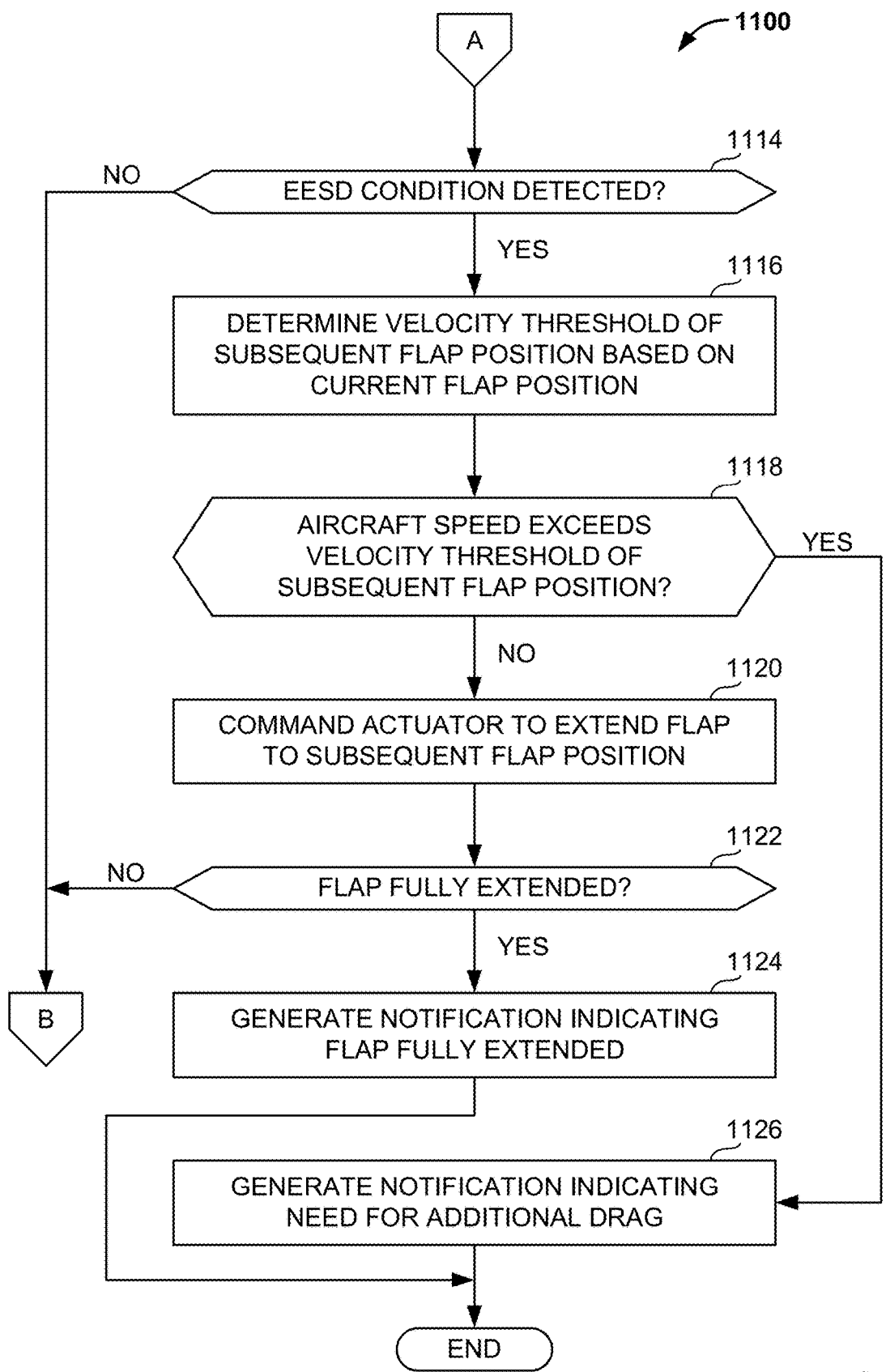
Figure 12:
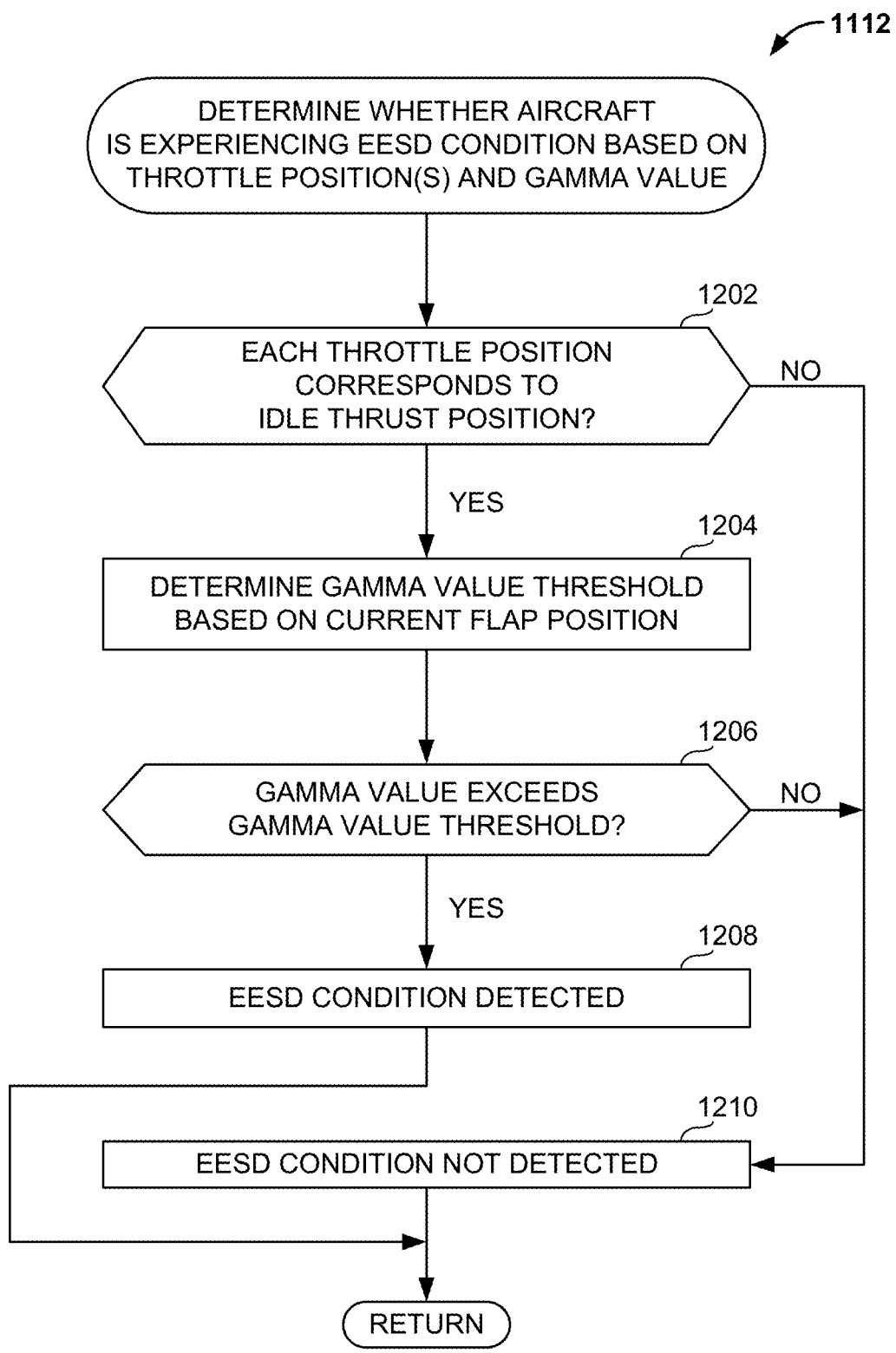
FIG. 12 is a flowchart representative of example machine-readable instructions that may be executed to implement the control system of FIG. 8 to determine whether an aircraft is experiencing an EESD condition based on a throttle position and a gamma value.

Flowcharts representative of example hardware logic, machine-readable instructions, hardware implemented state machines, and/or any combination thereof for implementing the control system 800 of FIG. 8 are shown in FIGS. 11A-11B and 12. The machine-readable instructions may be one or more executable program(s) or portion(s) of executable program(s) for execution by a computer processor such as the example processor 1302 shown in the example processor platform 1300 discussed below in connection with FIG. 13. The program(s) may be embodied in software stored on a non-transitory computer-readable storage medium such as a CD-ROM, a floppy disk, a hard drive, a DVD, a Blu-ray disk, or a memory associated with the processor 1302, but the entire program(s) and/or parts thereof could alternatively be executed by a device other than the processor 1302 and/or embodied in firmware or dedicated hardware. Further, although the example program(s) is/are described with reference to the flowcharts illustrated in FIGS. 11A-11B and 12, many other methods of implementing the example control system 800 of FIG. 8 may alternatively be used. For example, the order of execution of the blocks may be changed, and/or some of the blocks described may be changed, eliminated, or combined. Additionally or alternatively, any or all of the blocks may be implemented by one or more hardware circuit(s) (e.g., discrete and/or integrated analog and/or digital circuitry, a field-programmable gate array (FPGA), an ASIC, a comparator, an operational-amplifier (op-amp), a logic circuit, etc.) structured to perform the corresponding operation without executing software or firmware.

The machine-readable instructions described herein may be stored in one or more of a compressed format, an encrypted format, a fragmented format, a packaged format, etc. Machine-readable instructions as described herein may be stored as data (e.g., portions of instructions, code, representations of code, etc.) that may be utilized to create, manufacture, and/or produce machine-executable instructions. For example, the machine-readable instructions may be fragmented and stored on one or more storage device(s) and/or computing device(s) (e.g., servers). The machine-readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine-readable instructions may be stored in multiple parts, which are individually compressed, encrypted, and stored on separate computing devices, wherein the parts when decrypted, decompressed, and combined form a set of executable instructions that implement a program such as that described herein. In another example, the machine-readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, the disclosed machine-readable instructions and/or corresponding program(s) are intended to encompass such machine-readable instructions and/or program(s) regardless of the particular format or state of the machine-readable instructions and/or program(s) when stored or otherwise at rest or in transit.

As mentioned above, the example processes of FIGS. 11A-11B and 12 may be implemented using executable instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term "non-transitory computer-readable medium" is expressly defined to include any type of computer-readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIGS. 11A and 11B are a flowchart representative of example machine-readable instructions 1100 (e.g. a program) that may be executed to implement the control system 800 of FIG. 8 to automatically extend an aircraft wing flap in response to detecting that the aircraft is experiencing an EESD condition. The program 1100 of FIGS. 11A-11B begins when the flap position determiner 820 and/or, more generally, the controller 814 of FIG. 8 determines a current flap position of the flap 802 of FIG. 8 (block 1102). For example, the flap position determiner 820 can determine and/or identify a current flap position of the flap 802 based on the most recent flap position data that is available to the flap position determiner 820, either directly from the flap position sensor 806 of FIG. 8, or from the memory 818 of FIG. 8. Following block 1102, control of the program 1100 of FIGS. 11A-11B proceeds to block 1104.

At block 1104, the throttle position determiner 822 and/or, more generally, the controller 814 of FIG. 8 determines a throttle position of each throttle lever 832 of FIG. 8. For example, the throttle position determiner 822 can determine and/or identify a throttle position of each throttle lever 832 based on the most recent throttle position data that is available to the throttle position determiner 822, either directly from the throttle position sensor(s) 808 of FIG. 8, or from the memory 818 of FIG. 8. Following block 1104, control of the program 1100 of FIGS. 11A-11B proceeds to block 1106.

At block 1106, the ground speed determiner 824 and/or, more generally, the controller 814 of FIG. 8 determines a ground speed of the aircraft 100 implementing the control system 800 of FIG. 8. For example, the ground speed determiner 824 can determine and/or identify a ground speed of the aircraft 100 based on the most recent ground speed data that is available to the ground speed determiner 824, either directly from the ground speed sensor 810 of FIG. 8, or from the memory 818 of FIG. 8. Following block 1106, control of the program 1100 of FIGS. 11A-11B proceeds to block 1108.

At block 1108, the vertical speed determiner 826 and/or, more generally, the controller 814 of FIG. 8 determines a vertical speed of the aircraft 100 implementing the control system 800 of FIG. 8. For example, the vertical speed determiner 826 can determine and/or identify a vertical speed of the aircraft 100 based on the most recent vertical speed data that is available to the vertical speed determiner 826, either directly from the vertical speed sensor 812 of FIG. 8, or from the memory 818 of FIG. 8. Following block 1108, control of the program 1100 of FIGS. 11A-11B proceeds to block 1110.

At block 1110, the gamma value determiner 828 and/or, more generally, the controller 814 of FIG. 8 determines a gamma value (e.g., the gamma value 834 of FIG. 8) based on the ground speed and the vertical speed of the aircraft 100. For example, the gamma value determiner 828 can determine and/or calculate a gamma value of the aircraft 100 utilizing Equation 1 described above. The gamma value determined and/or calculated by the gamma value determiner 828 represents a flight path angle of the aircraft 100. Following block 1110, control of the program 1100 of FIGS. 11A-11B proceeds to block 1112.

At block 1112, the EESD condition detector 830 and/or, more generally, the controller 814 of FIG. 8 determines whether the aircraft 100 is experiencing an EESD condition based on the throttle position(s) and the gamma value. An example process that may be used to implement block 1112 of the example program 1100 of FIGS. 11A-11B is described in greater detail below in connection with FIG. 12. Following block 1112, control of the program 1100 of FIGS. 11A-11B proceeds to block 1114.

At block 1114, the controller 814 of FIG. 8 determines whether an EESD condition has been detected. For example, the controller 814 can determine that an EESD condition has been detected based on a notification (e.g., a first output signal) generated by the EESD condition detector 830 of FIG. 8 indicating that an EESD condition has been detected. The controller 814 can conversely determine that an EESD condition has not been detected based on a notification (e.g., a second output signal differing from the first output signal of the EESD condition detector 830) generated by the EESD condition detector 830 of FIG. 8 indicating that an EESD condition has not been detected. If the controller 814 determines at block 1114 that an EESD condition has not been detected, control of the program 1100 of FIGS. 11A-11B returns to block 1102. If the controller 814 instead determines at block 1114 that an EESD condition has been detected, control of the program 1100 of FIGS. 11A-11B proceeds to block 1116.

At block 1116, the controller 814 of FIG. 8 determines a velocity threshold (e.g., the velocity threshold 838 of FIG. 8) of a subsequent flap position of the flap 802 of FIG. 8 based on the current position of the flap 802. For example, the controller 814 can determine and/or identify the velocity threshold (e.g., $V_{FE}$) of a subsequent flap position of the flap 802 by accessing and/or otherwise consulting a velocity threshold correlation table (e.g., the velocity threshold correlation table 1000 of FIG. 10) that defines the applicable velocity threshold based on a correlated position of the flap 802 of FIG. 8 corresponding to the subsequent flap position (e.g., the flap position that sequentially follows the current flap position, as defined by the flap extension sequence). Following block 1116, control of the program 1100 of FIGS. 11A-11B proceeds to block 1118.

At block 1118, the controller 814 of FIG. 8 determines whether the speed (e.g., the ground speed, the true airspeed, the equivalent airspeed, the calibrated airspeed, the indicated airspeed, etc.) of the aircraft 100 exceeds the velocity threshold of the subsequent flap position. For example, the controller 814 can compare the speed of the aircraft 100 to the velocity threshold of the subsequent flap position to determine and/or detect whether the speed of the aircraft 100 exceeds the velocity threshold. If the controller 814 determines at block 1118 that the speed of the aircraft 100 does not exceed the velocity threshold of the subsequent slap position, control of the program 1100 of FIGS. 11A-11B proceeds to block 1120. If the controller 814 instead determines at block 1118 that the speed of the aircraft 100 exceeds the velocity threshold of the subsequent flap position, control of the program 1100 of FIGS. 11A-11B proceeds to block 1126.

At block 1120, the controller 814 of FIG. 8 commands the actuator 804 of FIG. 8 to extend the flap 802 of FIG. 8 from the current flap position to a subsequent flap position. For example, the controller 814 can command (e.g., via an output and/or control signal) the actuator 804 to extend the flap 802 from the current flap position to a subsequent flap position defined by a flap extension sequence (e.g., the flap extension sequence 602 of the flap extension sequence table 600 of FIG. 6). In this regard, the flap extension sequence includes predetermined successive flap extension positions between a stowed position of the flap 802 and a fully-extended position of the flap 802 to which the flap 802 can be successively (e.g., sequentially) extended via the actuator 804. Following block 1120, control of the program 1100 of FIGS. 11A-11B proceeds to block 1122.

At block 1122, the controller 814 of FIG. 8 determines whether the flap 802 of the control system 800 of FIG. 8 is fully extended. For example, the controller 814 can determine that the flap 802 has been extended to a fully-extended position identified via the applicable flap extension sequence (e.g., the flap extension sequence 602 of the flap extension sequence table 600 of FIG. 6). If the controller 814 determines at block 1122 that the flap 802 is not fully extended, control of the program 1100 of FIGS. 11A-11B returns to block 1102. If the controller 814 instead determines at block 1122 that the flap 802 is fully extended, control of the program 1100 of FIGS. 11A-11B proceeds to block 1124.

At block 1124, the controller 814 of FIG. 8 generates a notification indicating the flap 802 of FIG. 8 is fully extended. When presented via the user interface 816 of FIG. 8, such a notification may alert the end user (e.g., the pilot) of the aircraft 100 that further extension of the flap 802 is not available, and/or that manual (e.g., pilot-initiated) deployment of an alternate control surface (e.g., a spoiler) of the aircraft 100 is needed to increase the amount of drag on the aircraft 100 and/or to decrease the ground speed of the aircraft 100. Following block 1124, the program 1100 of FIGS. 11A-11B ends.

At block 1126, the controller 814 of FIG. 8 generates a notification indicating a need for additional drag on the aircraft 100. When presented via the user interface 816 of FIG. 8, such a notification may alert the end user (e.g., the pilot) of the aircraft 100 that manual (e.g., pilot-initiated) deployment of an alternate control surface (e.g., a spoiler) of the aircraft 100 is needed to increase the amount of drag on the aircraft 100 and/or to decrease the speed (e.g., the ground speed, the true airspeed, the equivalent airspeed, the calibrated airspeed, the indicated airspeed, etc.) of the aircraft 100. Following block 1126, the program 1100 of FIGS. 11A-11B ends.

FIG. 12 is a flowchart representative of example machine-readable instructions 1112 (e.g. a program) that may be executed to implement the control system 800 of FIG. 8 to determine whether the aircraft 100 is experiencing an EESD condition based on the throttle position and the gamma value. Example operations of blocks 1202, 1204, 1206, 1208, and 1210 of FIG. 12 may be used to implement block 1112 of FIGS. 11A-11B. The program 1112 of FIG. 12 begins when the EESD condition detector 830 and/or, more generally, the controller 814 of FIG. 8 determines whether each throttle position corresponds to an idle thrust position of the corresponding throttle lever 832 of FIG. 8 (block 1202). For example, the EESD condition detector 830 can determine that each throttle position corresponds an idle thrust position of the corresponding throttle lever 832 when each throttle position is zero (0). If the EESD condition detector 830 determines at block 1202 that each throttle position corresponds to an idle thrust position of the corresponding throttle lever 832, control of the program 1112 of FIG. 12 proceeds to block 1204. If the EESD condition detector 830 instead determines at block 1202 that each throttle position does not correspond to an idle thrust position of the corresponding throttle lever 832, control of the program 1112 of FIG. 12 proceeds to block 1210.

At block 1204, the EESD condition detector 830 and/or, more generally, the controller 814 of FIG. 8 determines a gamma value threshold (e.g., the gamma value threshold 836 of FIG. 8) based on the current flap position of the flap 802 of FIG. 8. For example, the EESD condition detector 830 can determine and/or identify the gamma value threshold by accessing and/or otherwise consulting a gamma value threshold correlation table (e.g., the gamma value threshold correlation table 900 of FIG. 9) that defines the applicable gamma value threshold based on a correlated position of the flap 802 of FIG. 8 corresponding to the current flap position. In some examples, the applicable gamma value threshold determined at block 1204 by the EESD condition detector 830 may additionally be based on the current speed (e.g., the current ground speed, the current true airspeed, the current equivalent airspeed, the current calibrated airspeed, the current indicated airspeed, etc.) of the aircraft 100. Following block 1204, control of the program 1112 of FIG. 12 proceeds to block 1206.

At block 1206, the EESD condition detector 830 and/or, more generally, the controller 814 of FIG. 8 determines whether the gamma value exceeds the gamma value threshold. For example, the EESD condition detector 830 can compare the gamma value to the gamma value threshold to determine and/or detect whether the gamma value exceeds the gamma value threshold. If the EESD condition detector 830 determines at block 1206 that the gamma value exceeds the gamma value threshold, control of the program 1112 of FIG. 12 proceeds to block 1208. If the EESD condition detector 830 instead determines at block 1206 that the gamma value does not exceed the gamma value threshold, control of the program 1112 of FIG. 12 proceeds to block 1210.

At block 1208, the EESD condition detector 830 and/or, more generally, the controller 814 of FIG. 8 indicates that an EESD condition has been detected. For example, the EESD condition detector 830 can generate a notification (e.g., via a first output signal) at block 1008 indicating that an EESD condition has been detected. Following block 1208, control of the program 1112 of FIG. 12 returns to a function call such as block 1112 of the program 1100 of FIGS. 11A-11B.

At block 1210, the EESD condition detector 830 and/or, more generally, the controller 814 of FIG. 8 indicates that an EESD condition has not been detected. For example, the EESD condition detector 830 can generate a notification (e.g., via a second output signal differing from the first output signal of the EESD condition detector 830) at block 1210 indicating that an EESD condition has not been detected. Following block 1210, control of the program 1112 of FIG. 12 returns to a function call such as block 1112 of the program 1100 of FIGS. 11A-11B.

Figure 13:
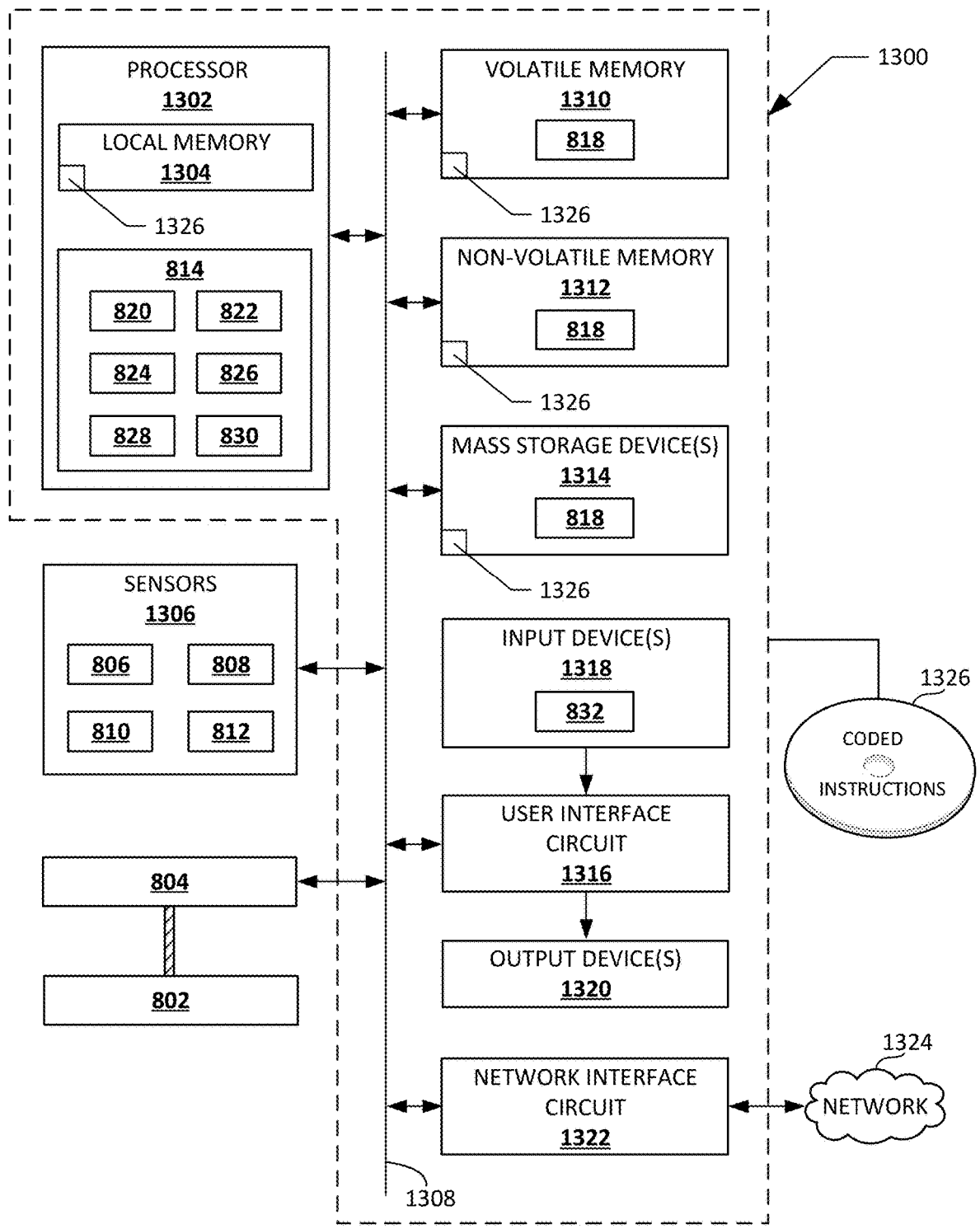
FIG. 13 is a block diagram of an example processor platform structured to execute the machine-readable instructions of FIGS. 11A-11B and 12 to implement the control system of FIG. 8.

FIG. 13 is a block diagram of an example processor platform 1300 structured to execute the machine-readable instructions (e.g. programs) 1100, 1112 of FIGS. 11A-11B and 12 to implement the control system 800 of FIG. 8. The processor platform 1300 of the illustrated example includes a processor 1302. The processor 1302 of the illustrated example is hardware. For example, the processor 1302 can be implemented by one or more integrated circuit(s), logic circuit(s), microprocessor(s), GPU(s), DSP(s), microcontroller(s), processor(s), or controller(s) from any desired family or manufacturer. The hardware processor may be a semiconductor based (e.g., silicon based) device. In this example, the processor 1302 implements the example controller 814 of FIG. 8, including the example flap position determiner 820, the example throttle position determiner 822, the example ground speed determiner 824, the example vertical speed determiner 826, the example gamma value determiner 828, and the example EESD condition detector 830 of the controller 814 of FIG. 8.

The processor 1302 of the illustrated example includes a local memory 1304 (e.g., a cache). The processor 1302 is in communication with the example actuator 804 of FIG. 8 and one or more sensors 1306 via a bus 1308. In this example, the sensors 1306 include the example flap position sensor 806, the example throttle position sensor(s) 808, the example ground speed sensor 810, and the example vertical speed sensor 812 of FIG. 8. The processor 1302 is also in communication with a main memory including a volatile memory 1310 and a non-volatile memory 1312 via the bus 1308. The volatile memory 1310 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1312 may be implemented by flash memory and/or any other desired type of memory device. Access to the main memory 1310, 1312 is controlled by a memory controller.

The processor platform 1300 of the illustrated example also includes one or more mass storage device(s) 1314 for storing software and/or data. Examples of such mass storage device(s) 1314 include floppy disk drives, hard drive disks, compact disk drives, Blu-ray disk drives, redundant array of independent disks (RAID) systems, and digital versatile disk (DVD) drives. In the illustrated example of FIG. 13, one or more of the volatile memory 1310, the non-volatile memory 1312, and/or the mass storage device(s) 1314 implement(s) the example memory 818 of FIG. 8.

The processor platform 1300 of the illustrated example also includes a user interface circuit 1316. The user interface circuit 1316 may be implemented by any type of interface standard, such as an Ethernet interface, a universal serial bus (USB), a Bluetooth® interface, a near field communication (NFC) interface, and/or a peripheral component interconnect (PCI) express interface. In the illustrated example, one or more input device(s) 1318 are connected to the user interface circuit 1316. The input device(s) 1318 permit(s) a user (e.g., a pilot of an aircraft) to enter data and/or commands into the processor 1302. The input device(s) 1318 can be implemented by, for example, one or more control lever(s) (e.g., the throttle lever(s) 832 of FIG. 8), button(s), knob(s), switch(es), touchscreen(s), audio sensor(s), microphone(s), and/or camera(s). One or more output device(s) 1320 are also connected to the user interface circuit 1316 of the illustrated example. The output device(s) 1320 can be implemented, for example, by one or more display device(s) (e.g., light emitting diode(s) (LEDs), organic light emitting diode(s) (OLEDs), liquid crystal display(s) (LCDs), touchscreen(s), etc.), tactile output device(s), and/or speaker(s). The user interface circuit 1316 of the illustrated example, thus, typically includes a graphics driver card, a graphics driver chip and/or a graphics driver processor. In the illustrated example of FIG. 13, the user interface circuit 1316, the input device(s) 1318, and the output device(s) 1320 collectively implement the example user interface 816 of FIG. 8.

The processor platform 1300 of the illustrated example also includes a network interface circuit 1322. The network interface circuit 1322 may be implemented by any type of interface standard, such as an Ethernet interface, a universal serial bus (USB), a Bluetooth® interface, a near field communication (NFC) interface, and/or a PCI express interface. The network interface circuit 1322 may include a radio transmitter, a radio receiver, and/or a radio transceiver to facilitate the exchange of data and/or signals with external machines (e.g., a server, a computing device, etc.) via a network 1324 (e.g., a controller area network (CAN), a local area network (LAN), a wireless local area network (WLAN), a cellular network, etc.).

Coded instructions 1326 including the example machine-readable instructions 1100, 1112 of FIGS. 11A-11B and 12 may be stored in the local memory 1304, in the volatile memory 1310, in the non-volatile memory 1312, on the mass storage device(s) 1314, and/or on a removable non-transitory computer-readable storage medium such as a flash memory stick, a CD, or a DVD.

From the foregoing, it will be appreciated that the above-disclosed methods and apparatus automatically extend aircraft wing flaps in response to detecting that the aircraft is experiencing an EESD condition. The disclosed methods and apparatus automatically detect that the aircraft is experiencing an EESD condition based on evaluation of the position(s) of the throttle lever(s) of the aircraft, and further based on evaluation of a gamma value (e.g., a flight path angle) of the aircraft relative to a flap-position-specific gamma value threshold. In response to detecting that the aircraft is experiencing the EESD condition, the disclosed methods and apparatus automatically command actuators of the aircraft coupled to the flaps of the aircraft to extend the flaps from a current flap position to a subsequent flap position defined by a flap extension sequence.

The disclosed methods and apparatus advantageously invoke automated flap transitions that, unlike the automated flap transitions invoked by the conventional flap extension logic described above, are not dependent upon the speed of the aircraft dropping below the subsequent flap transition speed threshold. By instead invoking automated flap transitions based on detected occurrences of EESD conditions, the disclosed methods and apparatus advantageously accelerate (e.g., relative to conventional flap extension logic) the timing by which such automated flap transitions occur, and also advantageously provide a flap transition solution for instances where the aircraft may otherwise be unable to decelerate to the subsequent flap transition threshold due to the excess energy associated with the steep descent.

The disclosed methods and apparatus perform the aforementioned detection and command operations in an automated manner without manual assistance and/or manual input from the end user (e.g., the pilot) of the aircraft. By enabling automated flap transitions in a manner that depends on detection of EESD conditions instead of depending on the speed of the aircraft dropping below a flap transition speed threshold, the disclosed methods and apparatus provide automated flap extension solutions having expanded, increased, and/or optimized operating availability relative to the conventional automated flap extension solutions described above.

The automated flap extension solutions provided by the disclosed methods and apparatus advantageously increase the amount of drag on the aircraft while the aircraft is experiencing an EESD condition, thereby resolving the aforementioned "go-down slow-down" problem. Increasing the amount of drag on the aircraft reduces the speed (e.g., the ground speed, the true airspeed, the equivalent airspeed, the calibrated airspeed, the indicated airspeed, etc.) of the aircraft. Reducing the speed of the aircraft while the aircraft is descending facilitates improved control and/or maneuverability of the aircraft during approach and/or the landing.

The following paragraphs provide various examples of the examples disclosed herein.

Example 1 includes a control system of an aircraft. The control system of Example 1 comprises one or more processors to determine whether the aircraft is experiencing an excess energy steep descent (EESD) condition. In response to determining that the aircraft is experiencing the EESD condition, the one or more processors are to command an actuator of the aircraft coupled to a flap of the aircraft to extend the flap from a current flap position to a subsequent flap position defined by a flap extension sequence.

Example 2 includes the control system of Example 1, wherein the one or more processors are to determine a gamma value of the aircraft based on a ground speed of the aircraft and a vertical speed of the aircraft. In Example 2, the one or more processors are to determine whether the aircraft is experiencing the EESD condition based on the gamma value and further based on a throttle position of a throttle lever of the aircraft.

Example 3 includes the control system of Example 2, wherein the gamma value represents a flight path angle of the aircraft.

Example 4 includes the control system of any of Examples 2-3, wherein the one or more processors are to detect an occurrence of the EESD condition in response to the gamma value exceeding a gamma value threshold while the throttle position corresponds to an idle thrust position of the throttle lever.

Example 5 includes the control system of Example 4, wherein the gamma value threshold varies based on the current flap position of the flap in relation to the flap extension sequence.

Example 6 includes the control system of any of Examples 1-5, wherein the flap extension sequence includes predetermined successive flap extension positions between a stowed position of the flap and a fully-extended position of the flap. In Example 6, the flap is successively extendible to respective ones of the predetermined successive flap extension positions via the actuator.

Example 7 includes the control system of any of Examples 1-6, wherein a speed of the aircraft is to decrease in response to the one or more processors commanding the actuator to extend the flap from the current flap position to the subsequent flap position.

Example 8 includes a method comprising determining, by executing one or more machine-readable instructions with one or more processors of a control system of an aircraft, whether the aircraft is experiencing an excess energy steep descent (EESD) condition. The method of Example 8 further comprises, in response to determining that the aircraft is experiencing the EESD condition, commanding, by executing one or more machine-readable instructions with the one or more processors, an actuator of the aircraft coupled to a flap of the aircraft to extend the flap from a current flap position to a subsequent flap position defined by a flap extension sequence.

Example 9 includes the method of Example 8, further comprising determining, by executing one or more machine-readable instructions with the one or more processors, a gamma value of the aircraft based on a ground speed of the aircraft and a vertical speed of the aircraft. In Example 9, determining whether the aircraft is experiencing the EESD condition is based on the gamma value and further based on a throttle position of a throttle lever of the aircraft.

Example 10 includes the method of Example 9, wherein the gamma value represents a flight path angle of the aircraft.

Example 11 includes the method of any of Examples 9-10, wherein an occurrence of the EESD condition is detected in response to the gamma value exceeding a gamma value threshold while the throttle position corresponds to an idle thrust position of the throttle lever.

Example 12 includes the method of Example 11, wherein the gamma value threshold varies based on the current flap position of the flap in relation to the flap extension sequence.

Example 13 includes the method of any of Examples 8-12, wherein the flap extension sequence includes predetermined successive flap extension positions between a stowed position of the flap and a fully-extended position of the flap. In Example 13, the flap is successively extendible to respective ones of the predetermined successive flap extension positions via the actuator.

Example 14 includes the method of any of Examples 8-13, wherein a speed of the aircraft decreases in response to the actuator extending the flap from the current flap position to the subsequent flap position.

Example 15 includes a computer program product comprising a computer usable medium having a computer readable program code embodied therein. The computer readable program code is adapted to be executed to implement a method of automatically extending aircraft wing flaps. The method comprises determining whether an aircraft is experiencing an excess energy steep descent (EESD) condition. The method further comprises, in response to determining that the aircraft is experiencing the EESD condition, commanding an actuator of the aircraft coupled to a flap of the aircraft to extend the flap from a current flap position to a subsequent flap position defined by a flap extension sequence.

Example 16 includes the computer program product of Example 15, wherein the method further comprises determining a gamma value of the aircraft based on a ground speed of the aircraft and a vertical speed of the aircraft. In Example 16, determining whether the aircraft is experiencing the EESD condition is based on the gamma value and further based on a throttle position of a throttle lever of the aircraft.

Example 17 includes the computer program product of Example 16, wherein the gamma value represents a flight path angle of the aircraft.

Example 18 includes the computer program product of any of Examples 16-17, wherein an occurrence of the EESD condition is detected in response to the gamma value exceeding a gamma value threshold while the throttle position corresponds to an idle thrust position of the throttle lever.

Example 19 includes the computer program product of Example 18, wherein the gamma value threshold varies based on the current flap position of the flap in relation to the flap extension sequence.

Example 20 includes the computer program product of any of Examples 15-19, wherein the flap extension sequence includes predetermined successive flap extension positions between a stowed position of the flap and a fully-extended position of the flap. In Example 20, the flap is successively extendible to respective ones of the predetermined successive flap extension positions via the actuator.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A control system of an aircraft, the control system comprising:
   non-transitory machine-readable instructions; and
   one or more processors to execute the machine-readable instructions to:
      determine whether the aircraft is experiencing an excess energy steep descent (EESD) condition, the EESD condition corresponding to a flight path angle that meets or exceeds an angular threshold when engines of the aircraft are operating at idle thrust, wherein the angular threshold varies based on a speed of the aircraft; and
      in response to determining that the aircraft is experiencing the EESD condition, command an actuator of the aircraft coupled to a flap of the aircraft to extend the flap from a current flap position to a subsequent flap position defined by a flap extension sequence.

2. The control system of claim 1, wherein the flap extension sequence includes predetermined successive flap extension positions between a stowed position of the flap and a fully-extended position of the flap, the flap being successively extendible to respective ones of the predetermined successive flap extension positions via the actuator.

3. The control system of claim 1, wherein the speed of the aircraft is to decrease in response to the one or more processors commanding the actuator to extend the flap from the current flap position to the subsequent flap position.

4. The control system of claim 1, wherein the one or more processors are to determine a gamma value of the aircraft based on the speed of the aircraft, and wherein the one or more processors are to determine whether the aircraft is experiencing the EESD condition based on the gamma value and further based on a throttle position of a throttle lever of the aircraft.

5. The control system of claim 4, wherein the gamma value corresponds to the flight path angle of the aircraft.

6. The control system of claim 4, wherein the one or more processors are to detect an occurrence of the EESD condition in response to the gamma value exceeding a gamma value threshold while the throttle position corresponds to an idle thrust position of the throttle lever.

7. The control system of claim 6, wherein the gamma value threshold varies based on the current flap position of the flap in relation to the flap extension sequence.

8. A method, comprising:
   determining, by executing one or more non-transitory machine-readable instructions with one or more processors of a control system of an aircraft, whether the aircraft is experiencing an excess energy steep descent (EESD) condition, the EESD condition corresponding to a flight path angle that meets or exceeds an angular threshold when engines of the aircraft are operating at idle thrust, wherein the angular threshold varies based on a speed of the aircraft; and
   in response to determining that the aircraft is experiencing the EESD condition, commanding, by executing one or more non-transitory machine-readable instructions with the one or more processors, an actuator of the aircraft coupled to a flap of the aircraft to extend the flap from a current flap position to a subsequent flap position defined by a flap extension sequence.

9. The method of claim 8, wherein the flap extension sequence includes predetermined successive flap extension positions between a stowed position of the flap and a fully-extended position of the flap, the flap being successively extendible to respective ones of the predetermined successive flap extension positions via the actuator.

10. The method of claim 8, wherein the speed of the aircraft decreases in response to the actuator extending the flap from the current flap position to the subsequent flap position.

11. The method of claim 8, further comprising determining, by executing one or more non-transitory machine-readable instructions with the one or more processors, a gamma value of the aircraft based on the speed of the aircraft, wherein determining whether the aircraft is experiencing the EESD condition is based on the gamma value and further based on a throttle position of a throttle lever of the aircraft.

12. The method of claim 11, wherein the gamma value corresponds to the flight path angle of the aircraft.

13. The method of claim 11, wherein an occurrence of the EESD condition is detected in response to the gamma value exceeding a gamma value threshold while the throttle position corresponds to an idle thrust position of the throttle lever.

14. The method of claim 13, wherein the gamma value threshold varies based on the current flap position of the flap in relation to the flap extension sequence.

15. A computer program product, comprising a computer usable medium having a computer readable program code embodied therein, the computer readable program code adapted to be executed to implement a method of automatically extending aircraft wing flaps, the method comprising:
determining whether an aircraft is experiencing an excess energy steep descent (EESD) condition, the EESD condition corresponding to a flight path angle that meets or exceeds an angular threshold when engines of the aircraft are operating at idle thrust, wherein the angular threshold varies based on a speed of the aircraft; and
in response to determining that the aircraft is experiencing the EESD condition, commanding an actuator of the aircraft coupled to a flap of the aircraft to extend the flap from a current flap position to a subsequent flap position defined by a flap extension sequence.

16. The computer program product of claim 15, wherein the flap extension sequence includes predetermined successive flap extension positions between a stowed position of the flap and a fully-extended position of the flap, the flap being successively extendible to respective ones of the predetermined successive flap extension positions via the actuator.

17. The computer program product of claim 15, wherein the method further comprises determining a gamma value of the aircraft based on a ground speed of the aircraft and a vertical speed of the aircraft, and wherein determining whether the aircraft is experiencing the EESD condition is based on the gamma value and further based on a throttle position of a throttle lever of the aircraft.

18. The computer program product of claim 17, wherein the gamma value corresponds to the flight path angle of the aircraft.

19. The computer program product of claim 17, wherein an occurrence of the EESD condition is detected in response to the gamma value exceeding a gamma value threshold while the throttle position corresponds to an idle thrust position of the throttle lever.

20. The computer program product of claim 19, wherein the gamma value threshold varies based on the current flap position of the flap in relation to the flap extension sequence.

* * * * *

UNITED STATES PATENT AND TRADEMARK OFFICE
CERTIFICATE OF CORRECTION

| | |
|---|---|
| PATENT NO. | : 11,897,596 B2 |
| APPLICATION NO. | : 17/357377 |
| DATED | : February 13, 2024 |
| INVENTOR(S) | : Sherwin C. Li |

It is certified that error appears in the above-identified patent and that said Letters Patent is hereby corrected as shown below:

In the Claims

On Column 29, Claim 1, Line 52, Delete "the machine readable" and insert --the non-transitory machine readable--

Signed and Sealed this
Nineteenth Day of March, 2024

Katherine Kelly Vidal
*Director of the United States Patent and Trademark Office*